United States Patent
Aloni et al.

(10) Patent No.: US 8,521,912 B2
(45) Date of Patent: Aug. 27, 2013

(54) METHOD AND SYSTEM FOR DIRECT DEVICE ACCESS

(75) Inventors: Eliezer Aloni, Zur Yigal (IL); Uri Elzur, Irvine, CA (US); Rafi Shalom, Givat Shmuel (IL); Kobby Carmona, Hod HaSharon (IL); Caitlin Bestler, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 457 days.

(21) Appl. No.: 11/945,672

(22) Filed: Nov. 27, 2007

(65) Prior Publication Data

US 2008/0133709 A1   Jun. 5, 2008

Related U.S. Application Data

(63) Continuation-in-part of application No. 11/623,011, filed on Jan. 12, 2007.

(60) Provisional application No. 60/758,581, filed on Jan. 12, 2006, provisional application No. 60/867,262, filed on Nov. 27, 2006.

(51) Int. Cl.
*G06F 15/16* (2006.01)

(52) U.S. Cl.
USPC ............ 709/250; 710/36; 710/262; 718/104; 718/1; 718/100; 718/105; 718/108; 714/48; 711/6; 711/153; 709/224

(58) Field of Classification Search
USPC ........................................... 709/250
See application file for complete search history.

(56) References Cited

U.S. PATENT DOCUMENTS

| | | | | |
|---|---|---|---|---|
| 4,843,541 A | * | 6/1989 | Bean et al. | 710/36 |
| 5,414,851 A | * | 5/1995 | Brice et al. | 718/104 |
| 6,075,938 A | * | 6/2000 | Bugnion et al. | 703/27 |
| 6,530,078 B1 | * | 3/2003 | Shmid et al. | 717/138 |
| 6,961,941 B1 | * | 11/2005 | Nelson et al. | 719/319 |

(Continued)

FOREIGN PATENT DOCUMENTS

| | | | |
|---|---|---|---|
| EP | 574691 A1 | * | 12/1993 |
| EP | 574691 B1 | * | 7/1997 |

OTHER PUBLICATIONS

Uhlig et al., "Intel Virtualization Technology", 2005.*

(Continued)

*Primary Examiner* — Krista Zele
*Assistant Examiner* — Ondrej Vostal
(74) *Attorney, Agent, or Firm* — Brinks Hofer Gilson & Lione

(57) ABSTRACT

Methods and systems for direct device access are disclosed. Aspects of one method may include a plurality of GOSs directly accessing a first network interface device, where the first network interface device may provide access to a network. One or more of the GOSs may be migrated to directly access a second network interface device, based on state information for each of the GOSs, where the state information may be maintained by the host. The GOSs may communicate data to a device coupled to the network by direct accessing the first and/or second network interface device. Similarly, the first and/or second network interface device may communicate data received from a device coupled to the network to one or more of the plurality of GOSs via direct access of the first and/or second network interface device.

51 Claims, 13 Drawing Sheets

(56) References Cited

U.S. PATENT DOCUMENTS

| | | | |
|---|---|---|---|
| 7,313,512 B1* | 12/2007 | Traut et al. | 703/23 |
| 7,313,793 B2* | 12/2007 | Traut et al. | 718/1 |
| 7,412,702 B1* | 8/2008 | Nelson et al. | 718/1 |
| 7,424,710 B1 | 9/2008 | Nelson et al. | |
| 7,478,173 B1* | 1/2009 | Delco | 709/250 |
| 7,484,208 B1* | 1/2009 | Nelson | 718/1 |
| 7,496,495 B2 | 2/2009 | Solomon et al. | |
| 7,515,589 B2* | 4/2009 | Bacher et al. | 370/392 |
| 7,577,722 B1* | 8/2009 | Khandekar et al. | 709/220 |
| 7,620,955 B1* | 11/2009 | Nelson | 719/312 |
| 7,647,589 B1* | 1/2010 | Dobrovolskiy et al. | 718/1 |
| 7,730,486 B2* | 6/2010 | Herington | 718/1 |
| 7,765,543 B1* | 7/2010 | Weissman et al. | 718/1 |
| 7,840,964 B2* | 11/2010 | Schoenberg et al. | 718/1 |
| 7,865,893 B1* | 1/2011 | Omelyanchuk et al. | 718/1 |
| 7,941,799 B2* | 5/2011 | Easton et al. | 718/1 |
| 7,984,108 B2* | 7/2011 | Landis et al. | 709/215 |
| 2002/0152344 A1* | 10/2002 | Holm et al. | 710/260 |
| 2003/0061379 A1* | 3/2003 | Craddock et al. | 709/238 |
| 2003/0187915 A1* | 10/2003 | Sun et al. | 709/201 |
| 2004/0093452 A1* | 5/2004 | Easton et al. | 710/305 |
| 2005/0097384 A1* | 5/2005 | Uehara et al. | 714/1 |
| 2005/0120160 A1* | 6/2005 | Plouffe et al. | 711/1 |
| 2005/0193137 A1 | 9/2005 | Farnham | |
| 2005/0268071 A1* | 12/2005 | Blandy et al. | 711/208 |
| 2005/0268298 A1* | 12/2005 | Hunt et al. | 718/1 |
| 2006/0005003 A1* | 1/2006 | Grobman | 713/2 |
| 2006/0070066 A1* | 3/2006 | Grobman | 718/1 |
| 2006/0206904 A1* | 9/2006 | Watkins et al. | 719/321 |
| 2006/0248528 A1 | 11/2006 | Oney et al. | |
| 2006/0288189 A1* | 12/2006 | Seth et al. | 711/207 |
| 2007/0050764 A1* | 3/2007 | Traut | 718/1 |
| 2007/0061441 A1* | 3/2007 | Landis et al. | 709/224 |
| 2007/0061492 A1* | 3/2007 | van Riel | 710/3 |
| 2007/0067769 A1* | 3/2007 | Geisinger | 718/1 |
| 2007/0074192 A1 | 3/2007 | Geisinger | |
| 2007/0101323 A1* | 5/2007 | Foley et al. | 718/1 |
| 2007/0156969 A1* | 7/2007 | Tian et al. | 711/141 |
| 2007/0156980 A1* | 7/2007 | Nayyar et al. | 711/158 |
| 2007/0162641 A1* | 7/2007 | Oztaskin et al. | 710/22 |
| 2008/0282241 A1 | 11/2008 | Dong | |

OTHER PUBLICATIONS

Linux Symposium et al., "Proceedings of the Linux Symposium", vol. two, 2006.*

Jones, "Implicit Operating System Awareness in a Virtual Machine Monitor", 2007.*

Barak et al., "Scalable Cluster Computing with MOSIX for LINUX", 1999.*

Bradford et al., "Live Wide-Area Migration of Virtual Machines Including Local Persistent State", 2007.*

Pratt, "Xen and the Art of Virtualization".*

Clark et al., Live Migration of Virtual Machines, 2005.*

Abels et al., "An Overview of Xen Virtualization", 2005.*

Hines et al., "Post-Copy Live Migration of Virtual Machines", 2009.*

Nelson et al., Fast Transparent Migration for Virtual Machines, 2005.*

Beck, "AAMP: A Multiprocessor Approach for Operating System and Application Migration".*

Travostino et al., "Seamless live migration of virtual machines over the MAN/WAN", 2006.*

Kadav et al., "Live Migration of Direct-Access Devices", 2005.*

LeVasseur et al., "Unmodified Device Driver Reuse and Improved System Dependability via Virtual Machines", 2004.*

Barham et al., "Xen and the Art of Virtualization", 2003.*

Magenheimer et al., "Xen and the Art of Open Source Virtualization", p. 331-348, 2004.*

Elango et al., "Exploring I/O in a Virtual Machine Environment", 2005.*

Sugerman, J. et al.; "Virtualizing I/O devices on VMware Workstation's hosted virtual machine monitor" Proceedings of the USENIX Annual Technical Conference, Jun. 25, 2001, pp. 1-14, XP002322825.

Barham, P. et al.; "Xen and the art of visualization" ACM SOSP. Proceedings of the ACM Symposium on Operating Systems Principles, ACM, US, vol. 37, No. 5; Oct. 19, 2003, pp. 164-177; XP002370804.

Piyush, Shivam et al.; "EMP: Zero-copy OS-bypass NIC-driven Gigabit Ethernet Message Passing" International Conference for High Performance Computing and Communications, ACM, US, Nov. 16, 2001, pp. 49-56, XP002360191.

Garfinkle, T. et al.; "Virtual Machine Monitors: Current Technology and Future Trends" Computer, IEEE Service Center, Los Alamitos, CA, US, vol. 38, No. 5, May 2005, pp. 39-47, XP011132222.

International Preliminary Report on Patentability corresponding to International Application No. PCT/US2007/000992, dated Jul. 24, 2008, 8 pages.

* cited by examiner

METHOD AND SYSTEM FOR DIRECT DEVICE ACCESS

CROSS-REFERENCE TO RELATED APPLICATIONS/INCORPORATION BY REFERENCE

This application is a Continuation-In-Part of U.S. application Ser. No. 11/623,011, filed on Jan. 12, 2007, which claims priority to U.S. Provisional Application Ser. No. 60/758,581, filed on Jan. 12, 2006. This application makes reference to, claims priority to, and claims benefit of the above stated applications.

This application also makes reference to, claims priority to, and claims benefit of U.S. Provisional Application Ser. No. 60/867,262, filed Nov. 27, 2006.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to network interfaces. More specifically, certain embodiments of the invention relate to a method and system for direct device access.

BACKGROUND OF THE INVENTION

In networking systems, a single server may be utilized to concurrently support multiple server operations or services. For example, a single server may be utilized for providing access to business applications while also operating as an email server, a database server, and/or an exchange server. The server may generally support the various server operations by utilizing a single operating system (OS). The server operations, via the single OS, make use of server processing resources such as, for example, the central processing unit (CPU), memory, network interface card (NIC), which may be referred to as a network interface device, peripheral sound card, and/or graphics card. In many instances, the demand for server operations generally vary based on the type of service provided and/or user needs. Consolidating server services into a single operation may result in an improvement in server efficiency. However, the level of protection provided through consolidated operations or separate operations may require consideration.

Another approach for improving server efficiency may be to utilize multiple operating systems running concurrently so that each operating system supports a different server operation, for example. The multiple operating systems may be referred to as guest operating systems (GOSs). This approach maintains the level of protection provided when server operations are not consolidated under a single operating system while also enabling the optimization of the usage of the processing resources available to the server.

The use of multiple GOSs may be referred to as OS virtualization because each GOS perceives itself to have full access to the server's hardware resources. In this regard, a GOS is unaware of the presence of any other GOS running on the server. In order to implement OS virtualization, a software layer may be needed to arbitrate access to the server's hardware resources. This software layer may be referred to as a hypervisor or virtual machine (VM) monitor, for example. The hypervisor may enable the multiple GOSs to access the hardware resources in a time-sharing manner. This software layer may be assisted by a trusted GOS (TGOS), which may also be referred to as a parent partition, or Virtual Machine Kernel (VMK) for instance. This software layer may be referred to as a hypervisor or virtual machine (VM) monitor, for example. The hypervisor may enable the multiple GOSs to access the hardware resources in a time-sharing manner.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for direct device access, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for direct device access. Aspects of the invention may comprise directly accessing by one or more of a plurality of GOSs, a first network interface device, which provides access to a network. The one or more of the GOSs may be migrated to directly access the network via at least a second network interface device on a second machine, based on state information for the GOSs, which may be maintained by a host. Prior to the migration, the host may indicate to the first network interface device to update host memory. The update may comprise, for example, information that has not been written to the host memory, where the information may be used to allow the first network interface device to directly access the network. The migration may occur after the first network interface device indicates to the host that the host memory may be updated. The host may, for example, stop processing for the GOS to be migrated, to keep the first network interface device from generating "dirty" objects that may not be apparent to the host. The host may also, for example, demote L4 to L2 and continue processing. Dirty objects or memory locations may be those portions of the memory that may have changed locally but not updated to the host memory. The host may also update the host memory of relevant memory objects in the first network interface device that it may know of. For example, the first network interface device may have communicated to the host various memory portions that may need to be updated to the host memory.

The first network interface device may be of the same type as the second network interface device, or the network interface devices may be different types. Different types may comprise, for example, network interface devices with different firmware versions. Any of the GOSs may be enabled to communicate data to a device coupled to the network by directly accessing a network interface device. Similarly, any of the plurality of GOSs may be enabled to utilize direct access of a network interface device to receive data from a device coupled to the network.

The GOSs may allocate and/or deallocate at least a portion of buffers used by each of the GOSs. The network interface devices may be enabled to cache addresses for these buffers. The buffer addresses of pinned and/or IO memory management unit (IOMMU) mapped buffers used for the GOSs may be cached by the corresponding GOSs. The allocation and the deallocation may occur dynamically, for example. The GOSs may also preallocate at least a portion of the buffers. The network interface devices may translate a guest physical address and/or a device logical address to a system physical address for accessing the buffers.

Figure 1:
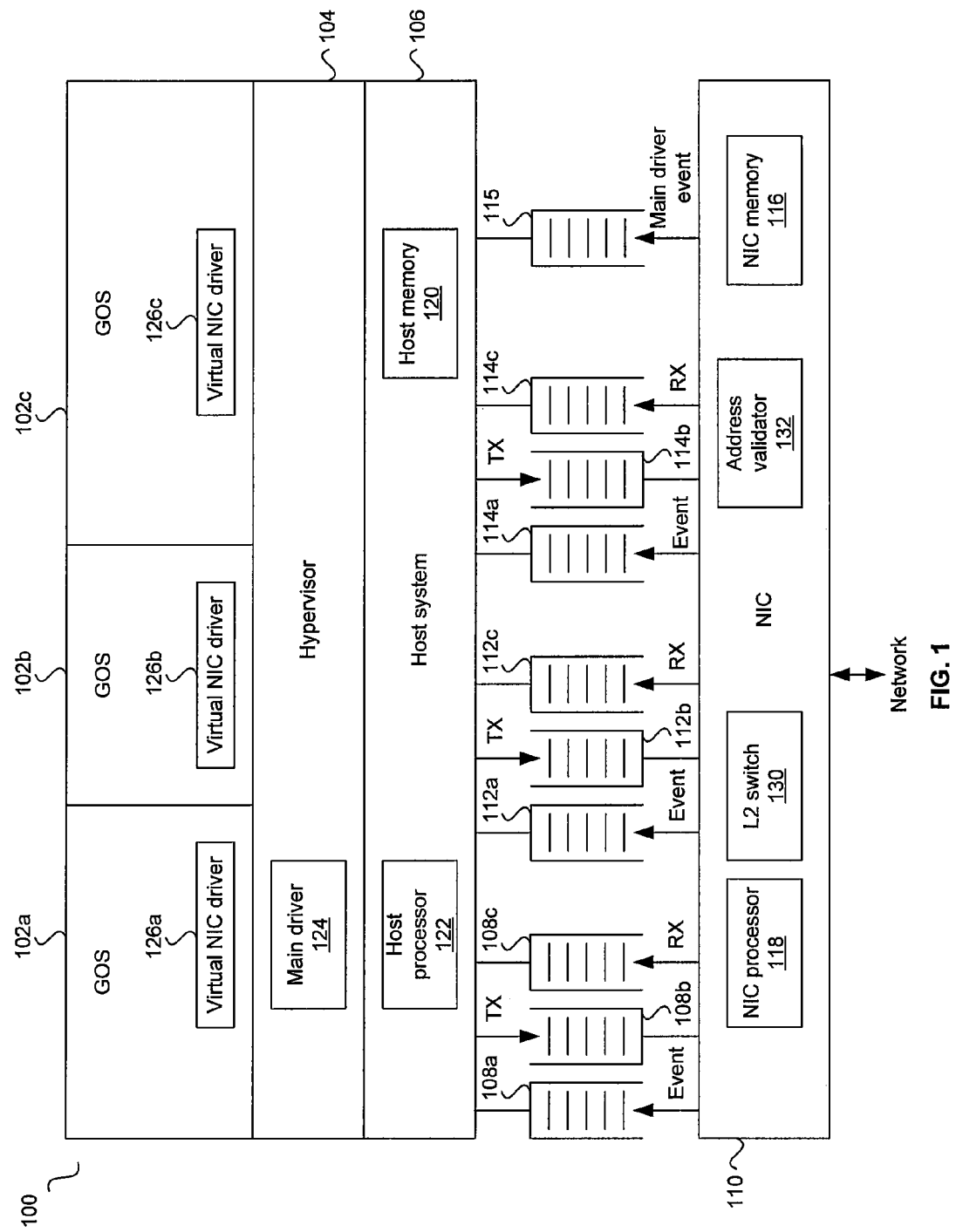
FIG. 1 is a block diagram of an exemplary system that supports network communication, which may be utilized in connection with an embodiment of the invention.

FIG. 1 is a block diagram of an exemplary system that supports network communication, which may be utilized in connection with an embodiment of the invention. Referring to FIG. 1, there is shown a network communication node 100 that comprises guest operating systems (GOSs) 102a, 102b, and 102c, a hypervisor 104, a host system 106, event queues 108a, 112a, and 114a, transmit (TX) queues 108b, 112b, and 114b, receive (RX) queues 108c, 112c, and 114c, a main driver event queue 115, and a NIC 110. The hypervisor 104 may comprise a main driver 124. The host system 106 may comprise a host processor 122 and a host memory 120. The NIC 110 may comprise a NIC processor 118, a NIC memory 116, a L2 switch 130, and an address validator 132. The NIC 110 may be implemented as a chip and/or a card, for example. The NIC 110 may be integrated into the chip set of the main processor.

The host system 106 may comprise suitable logic, circuitry, and/or code that may enable data processing and/or networking operations, for example. In some instances, the host system 106 may also comprise other hardware resources such as a graphics card and/or a peripheral sound card, for example. The host system 106 may support the operation of the GOSs 102a, 102b, and 102c via the hypervisor 104. The GOSs 102a, 102b, and 102c may each correspond to an operating system that may enable the running or execution of operations or services such as applications, email server operations, database server operations, and/or exchange server operations, for example. The number of GOSs that may be supported by the host system 106 by utilizing the hypervisor 104 need not be limited to any specific number. For example, two or more GOSs may be supported by the host system 106.

The hypervisor 104 may operate as a software layer that may enable OS virtualization of hardware resources in the host system 106 and/or virtualization of hardware resources communicatively connected to the host system 106, such as the NIC 110, for example. The hypervisor 104 may also enable data communication between the GOSs and hardware resources in the host system 106 and/or hardware resources communicatively connected to the host system 106. For example, the hypervisor 104 may enable communication between the GOSs supported by the host system 106 and the NIC 110 via the event queues 108a, 112a, and 114a, the TX queues 108b, 112b, and 114b, the RX queues 108c, 112c, and 114c, and/or the main driver event queue 115. In this regard, communication between the GOS 102a and the NIC 110 may occur via the event queue 108a, the TX queue 108b, and/or the RX queue 108c. Similarly, communication between the NIC 110 and the GOS 102b may occur via the event queue 112a, the TX queue 112b, and/or the RX queue 112c. Communication between the GOS 102c and the NIC 110 may occur via the event queue 114a, the TX queue 114b, and/or the RX queue 114c. In this regard, each set of queues may operate separately and independently from the others. The main driver event queue 115 may also be used to post an event relevant to the entire device, such as, for example, that the link is down or that the link is up, or an event that cannot be associated with a specific GOS. The GOS to NIC communication may also include a dedicated interrupt line signal from the NIC to the GOS. In some instances, the hypervisor (HV) may regulate it before the signal is provided to the GOS.

The hypervisor 104 may comprise a main driver 124 that may coordinate allocation of NIC resources such as, for example, queues and the interrupt line. The main driver 124 may also coordinate, for example, host bus resources such as personal component interchange (PCI) express base address registers and other resources. The main driver 124 may also handle exceptions and error cases. The main driver 124 may also coordinate transfer of data between the GOSs and the queues. The main driver may be referred to more generally as a back-end driver. The main driver 124 may communicate with the virtual NIC driver 126a in the GOS 102a, the virtual NIC driver 126b in the GOS 102b, and/or the virtual NIC driver 126c in the GOS 102c. A virtual NIC driver may also be referred to more generally as a front-end driver. Each virtual NIC driver may correspond to a portion of a GOS that may enable transfer of data between the operations or services performed by the GOSs and the appropriate queues via the main driver 124. For example, packets and/or descriptors of packets for transmission from an operation or service in the GOS 102*a* may be transferred to the TX queue 108*b* by the virtual NIC driver 126*a*. In another example, data posted to the event queue 108*a* to indicate a network condition or to report data transmission or data reception by the NIC 110, may be transferred to a buffer posted by the virtual NIC driver 126*a*. In another example, packets received by the NIC 110 from the network that have a MAC address that corresponds to the GOS 102*a* may be transferred from the RX queue 108*c* to a buffer posted by the virtual NIC driver 126*a*. The NIC 110 and the main driver 124 may also communicate via, for example, the main driver event queue 115 for resource allocation and/or communication of errors or network events. For example, the network status such as whether a network link is up or down may be communicated using the default queues.

The host processor 122 may comprise suitable logic, circuitry, and/or code that may enable control and/or management of the data processing and/or networking operations associated with the host system 106. The host memory 120 may comprise suitable logic, circuitry, and/or code that may enable storage of data utilized by the host system 106. The host memory 120 may be partitioned into a plurality of memory portions. For example, each GOS supported by the host system 106 may have a corresponding memory portion in the host memory 120. Moreover, the hypervisor 104 may have a corresponding memory portion in the host memory 120. In this regard, the hypervisor 104 may enable data communication between GOSs by controlling the transfer of data from a portion of the memory 120 that corresponds to one GOS to another portion of the memory 120 that corresponds to another GOS.

The NIC 110 may comprise suitable logic, circuitry, and/or code that may enable communication of data with a network. The NIC 110 may enable basic L2 data service, L2 switching, TCP offload, iSCSI, and/or RDMA operations, for example. The NIC 110 may be referred to as an OS virtualization-aware NIC because communication with each GOS occurs by an independent set of queues and/or other features that may support, for example, PCI special interests group (SIG) IO virtualization (IOV) specifications. The NIC 110 may determine the MAC address of received packets and may transfer the received packets to the RX queue that corresponds to the GOS with the appropriate MAC address. Other classifications that may be used by the NIC to determine a target GOS may be, for example, a combination of <MAC, VLAN ID>. Various embodiments of the invention may additionally, or in place of, use other classifications for determining the target GOS. Similarly, the NIC 110 may enable transfer of packets from the GOSs to the network by delivering data received directly from a GOS for transmission and/or by coordinating and/or arbitrating the order in which packets posted for transmission in the TX queues may be transmitted. This data may comprise a L2 buffer data or buffer descriptor or other reference to a buffer of the GOS, and/or transport (e.g. TCP) buffer data or buffer descriptor or other reference to a buffer of the GOS and/or transport (e.g. TCP) buffer data or buffer descriptor or other reference to a buffer of the GOS, and/or a buffer data owned by another entity (e.g. a session layer) or buffer descriptor or other reference to a buffer of the GOS (e.g. application data for RDMA). In this regard, the NIC 110 is said to enable direct input/output (I/O) or hypervisor bypass operations.

The event queues 108*a*, 112*a*, and 114*a* may comprise suitable logic, circuitry, and/or code that may enable posting of data by the NIC 110 to indicate the occurrence of an event. For example, the NIC 110 may post data in the event queues to indicate a GOS specific event. An embodiment of the invention may post an event relevant to the entire device, such as, for example, that the link is down or that the link is up, or an event that cannot be associated with a specific GOS, on the main driver event queue 115 only. Other embodiments of the invention may allow posting such information to other event queues. For example, various embodiments of the invention may enable the current status of the link, whether it is up or down, for example, to be posted to all the event queues.

The TX queues 108*b*, 112*b*, and 114*b* may comprise suitable logic, circuitry, and/or code that may enable posting of data for transmission via the NIC 110 from the GOSs 102*a*, 102*b*, and 102*c*, respectively. The RX queues 108*c*, 112*c*, and 114*c* may comprise suitable logic, circuitry, and/or code that may enable posting of data received via the NIC 110 for processing by the GOSs 102*a*, 102*b*, and 102*c*, respectively. The TX queues 108*b*, 112*b*, and 114*b* and/or the RX queues 108*c*, 112*c*, and 114*c* may be integrated into the NIC 110, for example, or reside in host memory 120 or have the headers cached on the NIC 110.

The NIC processor 118 may comprise suitable logic, circuitry, and/or code that may enable control and/or management of the data processing and/or networking operations in the NIC 110. The NIC memory 116 may comprise suitable logic, circuitry, and/or code that may enable storage of data utilized by the NIC 110. The NIC 110 may be shared by a plurality of GOSs 102*a*, 102*b*, and 102*c*, and by the main driver 124 for operations on behalf of the hypervisor 104 for control and/or for data transfer. In some embodiments of the invention, network protocol operations may be offloaded to the NIC 110 and handled by the NIC 110. The offloaded network protocol operations may comprise OSI layer 3, 4, and/or 5 protocol operations, such as, for example, TCP and/or IP operations, and/or iSCSI and/or RDMA on behalf of an application or a middle layer software. The NIC may also execute link layer network protocol operations, which may be, for example, OSI layer 2 protocol operations.

Accordingly, the NIC 110 may be a shared resource for the plurality of GOSs. The operations of the GOSs and the NIC may be coordinated by a hypervisor, such as, for example, the hypervisor 104 that may have the functionality of a hypervisor and a parent partition. Alternatively, a parent partition and a hypervisor may be implemented separately and together may coordinate operation of the GOSs. The implementation for coordinating the operations of a NIC and GOSs may be design dependent. Operation of a GOS and a NIC may comprise copying data between a GOS and the NIC. This may be accomplished by the NIC when the GOS communicates to the NIC an address of a buffer to be accessed in that GOS. The address may be a physical address or a virtual address. A virtual address may be translated to a physical address based on one or more address translation tables. Address translation is explained in more detail with respect to the FIGS. 3A, 3B, 4A, 4B, 4C, and 4D.

The L2 switch 130, which may also be referred to as a bridge, may comprise suitable logic, circuitry, and/or code that may enable the NIC 110 to support packet communication between a GOS and the network and/or between GOSs, for example. The L2 switch functionality is well known. The NIC 110 may also comprise an address validator 132. The address validator 132 may comprise suitable logic, circuitry, and/or code that may enable the validation of the address of a buffer posted by a virtual NIC driver to store a received packet. For example, before a packet in a RX queue is transferred to a posted buffer, the address validator 132 may validate that the posted buffer is in an address or memory location that corresponds to the GOS associated with the received packet. When the address is validated, the received packet may be transferred from the RX queue to the posted buffer. In case the address can not be validated as belonging to that GOS, the NIC 110 may signal an error by using an event queue, for instance, with or without the received packet, and/or its headers, and/or the virtual NIC driver for the GOS may post a new buffer to receive the packet from the RX queue. The address validator 132 may be similarly employed to check the validity of a buffer containing data to be transmitted and/or of any other command or control structure provided to the NIC 110. Various embodiments of the invention utilizing the GOS and the hypervisor may be described with respect to FIGS. 2A, 2B, 2C, 3A, 3B, 3C, 4A, 4B, and 4C.

Figure 2:
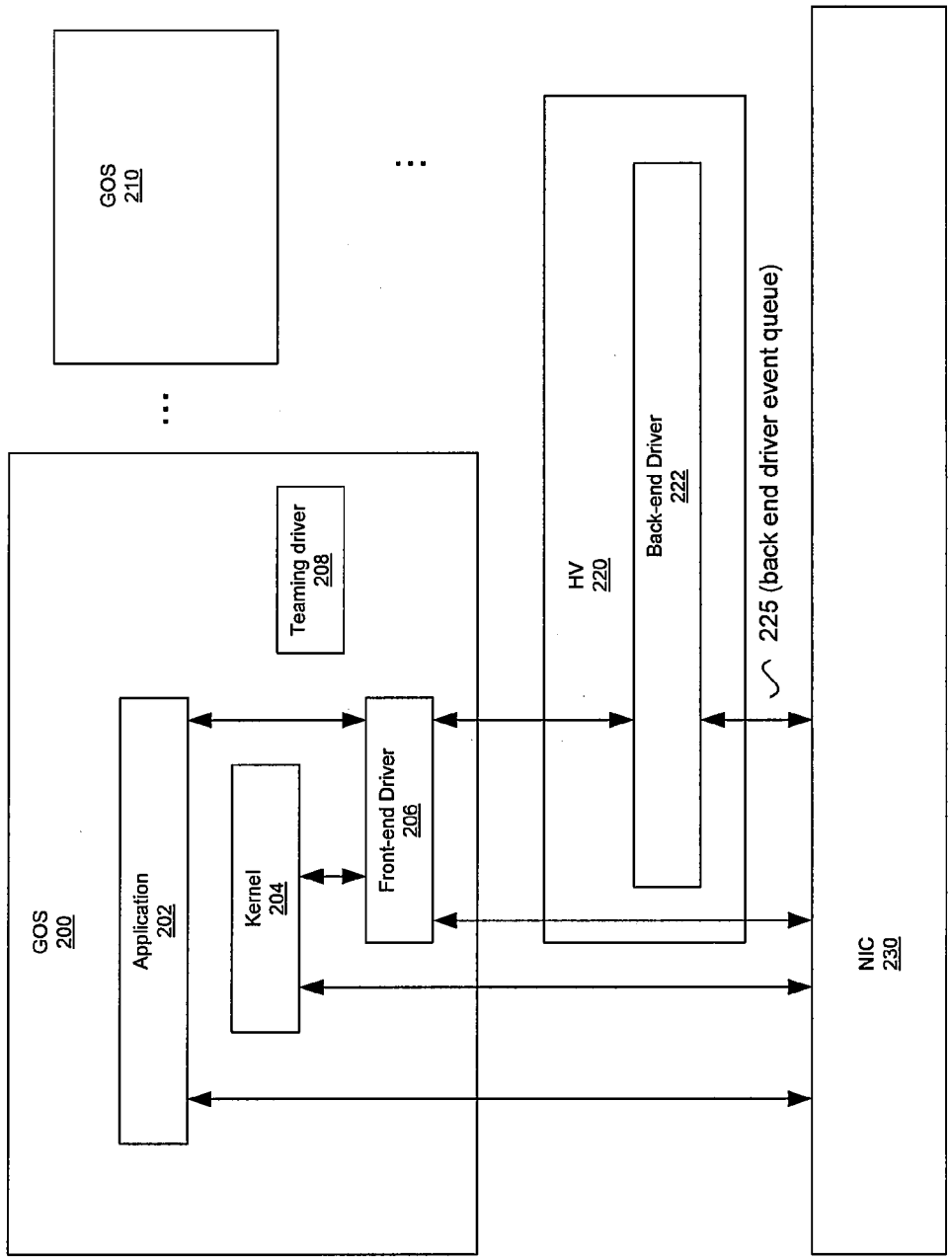
FIG. 2 is a block diagram illustrating exemplary direct device access, in accordance with an embodiment of the invention.

FIG. 2 is a block diagram illustrating exemplary direct device access, in accordance with an embodiment of the invention. Referring to FIG. 2, there is shown a plurality of guest operating systems (GOSs) 200 . . . 210, a hypervisor 220, and a NIC 230. Each of the GOSs 200 . . . 210, which may be, for example, similar to the GOS 102*a*, 102*b*, and/or 102*c*, may comprise an application software 202, an operating system kernel 204, a front-end driver 206, and a teaming driver 208. The hypervisor 220 may comprise, for example, the back-end driver 222. The NIC 230 may be similar to the NIC 110. A back-end driver may be associated with each physical device, or with each physical Ethernet port enumerated separately on PCI, such as, for example, the NIC 230. Accordingly, if there is a plurality of NICs, there may be a back-end driver for each of the plurality of NICs. There may also be a front-end driver associated with each GOS. Accordingly, if there is a plurality of GOSs, there may be a front-end driver associated with each GOS.

The application software 202 may comprise, for example, server operations such as email server operations, database server operations, and/or application server operations. The application software 202 may also enable, for example, similar operations for a client machine. The front-end driver 206 may comprise suitable code that may enable making slow path requests to the back-end driver 222 and fast path requests directly to the NIC 230. A slow path may be a path that comprises at least one intermediary entity in addition to the data origin and data destination in, for example, the network communication node 100. For example, the source may be the front-end driver 206 in the GOS 200 and the destination may be the NIC 230. The intermediary process may be, for example, the back-end driver 222 in the hypervisor 220.

The teaming driver 208 may comprise suitable code that may enable coordinating the use of a plurality of front-end drivers. For example, if there are two front-end drivers for redundancy, the teaming driver 208 may determine when to switch from one front-end driver to another.

A fast path may be a path that comprises the source and destination in, for example, the network communication node 100. For example, the source may be the front-end driver 206 in the GOS 200 and the destination may be the NIC 230, where the GOS 200 may have direct device access to the NIC 230. The front-end driver 206 may also enable pinning, or disabling a memory portion from being swapped, by making pin requests to the hypervisor 220. Requests to the hypervisor 220 may be made via, for example, a hypercall.

The back-end driver 222 in the hypervisor 220 may comprise suitable code that may allow resource allocation, and creation of association between a GOS and resources such as, for example, between a PCI function and a GOS, or memory range and a GOS, and/or creation of slow path data structures, per-connection data structures, and may also handle L2/L4/L5 slow path operations. The slow-path data structures and per-connection data structures may be used, for example, for initialization of GOSs, driver loading and unloading, and connection establishment and tear-down. The L2/L4/L5 operations may comprise, for example, verifying that a GOS that may be establishing a new connection has privilege to establish that connection and/or is within bounds of its domain. This may be, for example, to keep email servers for different entities (or GOSs) from interfering with each other. While the back-end driver 222 may be shown as being part of the hypervisor 220, the invention need not be so limited. For example, the back-end driver 222 may be compartmentalized separately to limit interferences to the hypervisor 220. In this manner, for example, the back-end driver 222 may be updated without affecting the hypervisor 220.

Once a GOS has established a new connection, data packets may be transferred via the fast path between the specific GOS and, for example, the NIC 230. Accordingly, data may be transferred between the network and the application, for example, an email server, without additional overhead of transferring data via other processes.

In operation, the application software 202, which may be, for example, an email server, may be assigned to be used with the GOS 200. Accordingly, the application server 202 may transmit and receive data packets from a network, for example, the Internet, which may be accessed via the NIC 230. In order to get access to a network, one or more resources may be allocated on the NIC 230 to provide network services between the application software 202 and the network using the NIC 230. The resources may be allocated and set in operational mode via the slow path that may comprise, for example, the hypervisor 220 and/or the back-end driver 222. Once the resource is allocated and the association between such resource, the GOS 200, and the NIC 230 is established, data to be transmitted to the network from the GOS 200 may be sent via the fast path. Similarly, data received from the network by the NIC 230 may be sent via the fast path to the GOS 200.

The fast path data transfer may comprise, for example, a zero-copy transfer between the application software 202 and the NIC 230. Zero-copy transfer may comprise, for example, the NIC 230 receiving data from a network, processing the data, and copying the processed data to a user buffer accessible to the application software 202. For example, a destination MAC/VLAN/port address, or a subset thereof, may be used to determine a destination GOS for a received packet. A buffer in the context of that partition may be found or allocated using L3-L4 header information in the received packet. Techniques for selecting a target buffer given the L3-L4 header are independent of virtualization issues, and accordingly may be design dependent.

Similarly, a zero-copy transfer may be used for transmitting data to the network, where the data to be transmitted may be copied from a user buffer accessible to the application software 202 to a NIC buffer on the NIC 230, where the data in the NIC buffer may be processed and formatted for transmission. However the invention may not be so limited. For example, buffers and/or buffer descriptors, or any other pertinent information directly exchanged between a GOS and the NIC 230, may belong to the kernel 204 (e.g. TCP/IP stack or storage stack) and/or to the front end driver 206 for networking or storage.

Figure 3A:
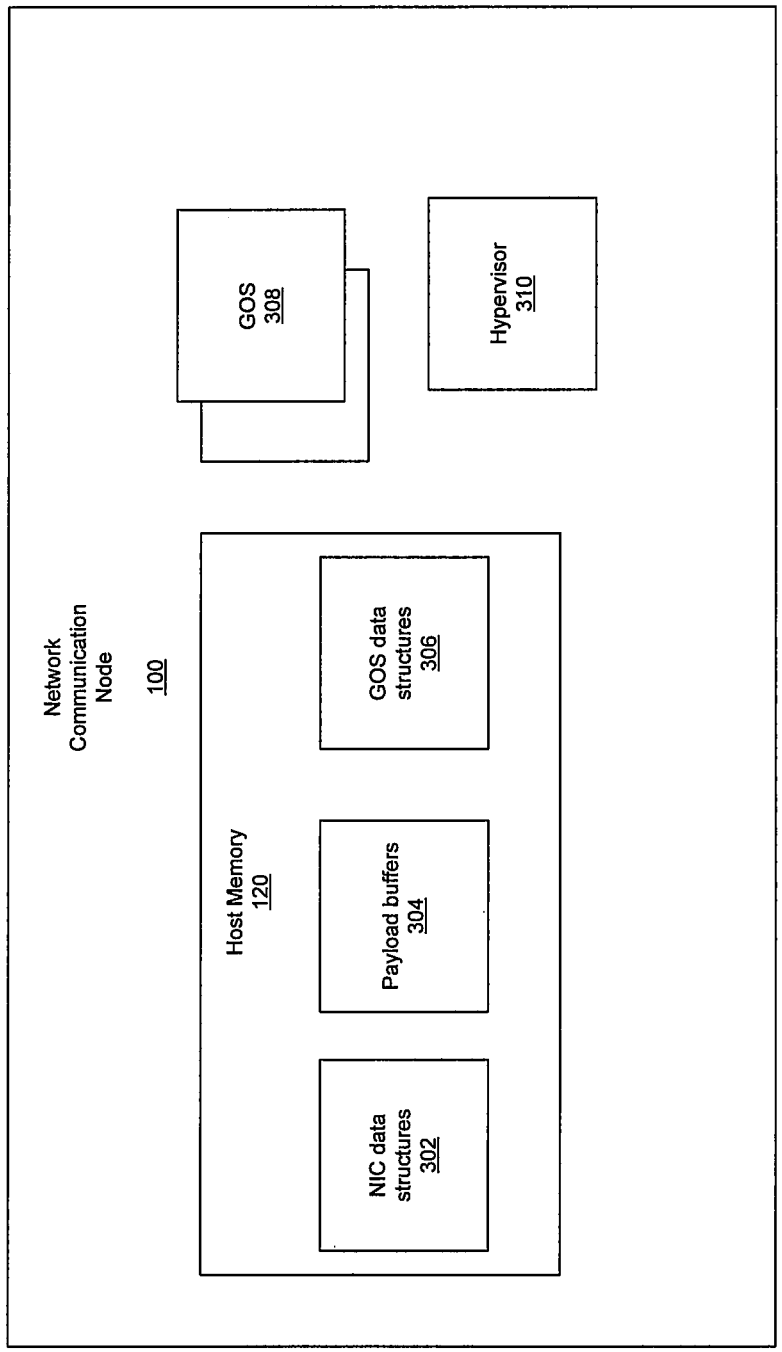
FIG. 3A is a block diagram illustrating exemplary data structures that may be used by a GOS, in accordance with an embodiment of the invention.

FIG. 3A is a block diagram illustrating exemplary data structures that may be used by a GOS, in accordance with an embodiment of the invention. Referring to FIG. 3A, there is shown the network communication node 100, NIC data structures 302, payload buffers 304, and GOS data structures 306.

There is also shown a plurality of GOSs 308 and a hypervisor 310. The GOSs 308 may be similar to, for example, the GOSs 102a, 102b, and 102c. The hypervisor 310 may be similar to, for example, the hypervisor 104. The NIC data structures 302, the payload buffers 304, and the GOS data structures 306 may be allocated from a memory area, such as, for example, portions of the host memory 120. The memory area for the NIC data structures 302 may belong to, for example, the hypervisor 310. The memory area for the payload buffers 304 and the GOS data structures 306 may belong to, for example, the GOSs 308 and/or the hypervisor 310.

The NIC data structures 302 may be allocated upon loading a back-end driver, such as, for example, the back-end driver 222, and may be de-allocated upon unloading the back-end driver 222. Upon being allocated, the NIC data structures 302 may be pinned by the back-end driver 222 to avoid being swapped. Pinning by the back-end driver 222 and/or by the hypervisor 310 may be referred to as being physically pinned. The back-end driver 222 may initialize the NIC data structures 302, but the initialized NIC data structures 302 may be owned by a hardware device, such as, for example, the NIC 230.

The NIC data structures 302 may be used, for example, as private data bases for the NIC 230. The NIC data structures 302 may also be used in a slow path hardware-software interface (HSI) between, for example, the NIC 304 and the GOSs 200 . . . 210 and/or the hypervisor 220. The slow path HSI may comprise, for example, event queues such as the event queues 108a, 112a, and 114a. Various embodiments of the invention may comprise a separate event queue that may connect, for example, the NIC 230 to the back end driver 222. This queue may be referred to as, for example, the back-end driver event queue 225.

The payload buffers 304 may be allocated from, for example, the host memory 120. The payload buffers 304 may be used to communicate data from, for example, the GOS 200 to the NIC 230. The NIC 230 may then transmit the data on to a network. Similarly, the payload buffers 304 may be used to communicate data that may be received from a network, where the data may be received by the NIC 230.

Figure 3B:
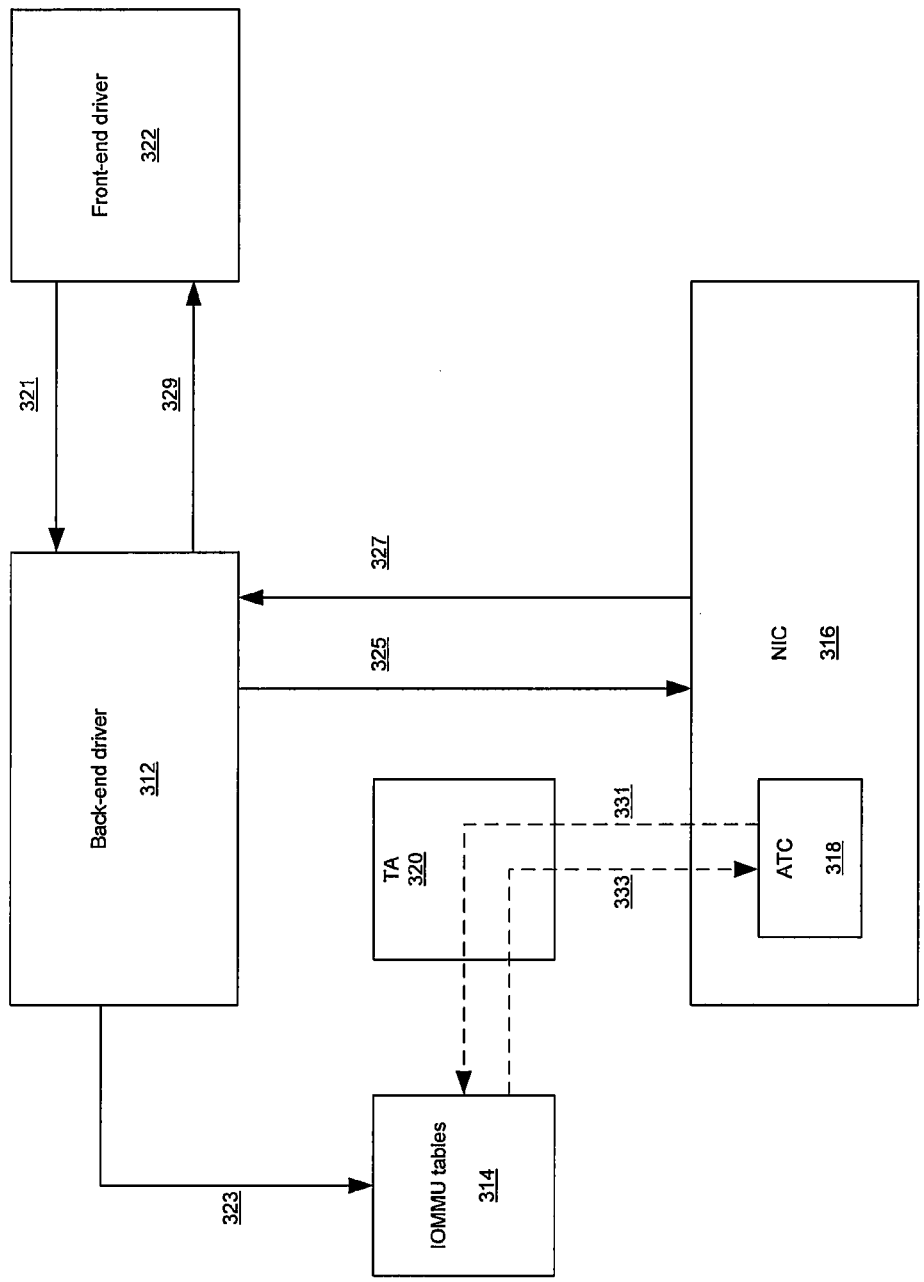
FIG. 3B is a diagram illustrating exemplary steps for allocating GOS static data structures, in accordance with an embodiment of the invention.

The GOS data structures 306 may be, for example, used for per GOS HSI and/or per connection HSI, such as transmit and/or receive queues 108b, 108c, 112b, 112c, 114b, and 114c. The per connection structures may be allocated and de-allocated many times during a lifetime of a front-end driver. The GOS data structures 306 may be, for example, on the GOS physical memory space, and may be allocated by a front-end driver, such as, for example, the front-end driver 206 via a slow path. After allocation, the GOS data structures may be accessed by associated front-end drivers via the fast path. An address translation cache (ATC) may be provided on a NIC, for example, the NIC 230, for caching the system physical addresses (SPAs) of the GOS data structures. The NIC 230 may or may not cache address translation pairs in the ATC. For example, the ATC may comprise a mechanism to communicate with a translation agent (TA) and IOMMU to obtain the SPA for a given guest physical addresses (GPA). However, it may also include memory or caching to store the translations FIG. 3B is a diagram illustrating exemplary steps for allocating GOS static data structures, in accordance with an embodiment of the invention. Referring to FIG. 3B, there is shown a front-end driver 322, a back-end driver 312, IOMMU tables 314, a NIC 316, an address translation cache (ATC) 318, and a translation agent (TA) 320. The front-end driver 322 may be similar to the front-end driver 206, and the back-end driver 312 may be similar to the back-end driver 222. The IOMMU tables 314 may comprise suitable logic, circuitry, and/or code that may keep track of various addresses for a GOS and/or a connection. The NIC 316 may be similar to the NIC 230. The NIC 316 may also comprise the ATC 318 that may enable caching addresses for use by the NIC 316. The specific method used by the ATC 318 for deciding when to cache addresses and when to remove cached addresses may be design dependent. The TA 320 may comprise suitable logic, circuitry, and/or code that may enable translation of guest physical addresses (GPAs) to system physical addresses (SPAs).

In operation, memory for payload buffers may be allocated from the guest physical address (GPA) space, which may be the memory space that a GOS, for example, the GOS 200, may perceive as its own physical address space. The GPA may be the same as the PCI device address utilized by a device, and the GPA may need to be translated to a system physical address (SPA) that may be the address used to access the physical memory in the system. The front-end driver 322 may send a message 321, which may be a slow path command, to the back-end driver 312 informing the back-end driver of the GPA for the payload buffers. A message may communicate information, and may be, for example, one or more command message, one or more status message, and/or data.

The back-end driver 312 and/or the hypervisor 310, may then physically pin the GOS allocated payload buffers. The back-end driver 312 may send messages 323 to update the IOMMU tables 314 with the GPA for the GOS buffers. In other embodiments of the invention, the TA 320 may be combined with the IOMMU tables 314 to form a single entity. Some embodiments of the invention may allow the back-end driver 312 to do address translation from GPA to SPA. The back-end driver 312 may further send a message 325, which may be a slow path command, comprising the GPA and/or SPA of the GOS buffer to the NIC 316. The NIC 316 may then, for example, send a completed status message 327 to the back-end driver 312. The back-end driver 312 may then send a completed status message 329 to the front-end driver 310. In other embodiments of the invention, the front-end driver 322 may send the message 325 with the GPA directly to the NIC 316, and message 327 may be sent directly from the NIC 316 to the front-end driver 322.

The ATC 318 in the NIC 316 may have a translation of the GPA. If so, the GPA may be translated by the ATC 318. Otherwise, the ATC 318 may make a request 331 to the TA 320 for a translation. The TA 320 may translate the address based upon the entries in the IOMMU tables 314. The translation response 333 may then be received from the TA 320. The ATC 318 may cache the SPA, and the GOS buffer may be accessed using the SPA.

Some embodiments of the invention may allow address translation and mapping where all physically resident GOS memory may be mapped to the IOMMU tables 314. However, these memories may not necessarily be physically pinned unless they are used for DMA transfers. Any swap in or out may require an update to the appropriate portion of the IOMMU tables 314. Other embodiments of the invention may map memories that may be used for IO to the IOMMU tables 314, and these mapped memories may be pinned. The pinning may occur via communication with the back-end driver 312 and/or via a hypercall to the hypervisor 220. The number of pinned pages for each GOS may be design and/or implementation dependent. Accordingly, a pinning request for a new buffer by the front-end driver 322 may result in a failed pin request if the number of pinned pages is presently equal to the number of allowed pinned pages. The front-end driver may then un-pin a completed buffer and re-request pinning of the new buffer.

The front-end driver 322 associated with a GOS may control assignment of PCI addresses for devices in that GOS. The front-end driver 322 may perform a hypercall to the hypervisor 220, which may comprise the back-end driver 312, to pin and map addresses for PCI devices that may be used by the GOS. The GOS may associate a GPA to a PCI address for the PCI devices. The PCI address and the GPA may be provided to the hypervisor 220 by the front-end driver 322. The hypervisor 220 may traverse a MMU (not shown) to translate the GPA to an SPA. The hypervisor 220 may also create a page table entry in the IOMMU tables 314 for translating the PCI addresses of PCI devices in the GOS to SPAs. While a hypercall described may be an example of front-end/back-end communication, the specific communication method may be design dependent.

While some embodiments of the invention may assume the un-translated PCI addresses used by the NIC 316 to be the same as the GPAs, other embodiments of the invention may refer to the un-translated PCI addresses as device logical addresses (DLA). When DLAs are used, the front-end driver 322 may send the pin and map request to the NIC 316 along with the GPA and the DLA of the buffer. The front-end driver 322 may then post buffers with DLA to the NIC 316. The hypervisor 220, which may comprise the back-end driver 312, may pin the buffer according to its GPA. The hypervisor 220 may also acquire the SPA for the GPA and map the buffer to the IOMMU tables 314 in the entry indicated by the DLA.

While the IOMMU tables 314 and the TA 320 may have been described as separate blocks, the invention need not be so limited. For example, some embodiments of the invention may describe the IOMMU tables 314 and the TA 320 as a single functional block.

Figure 3C:
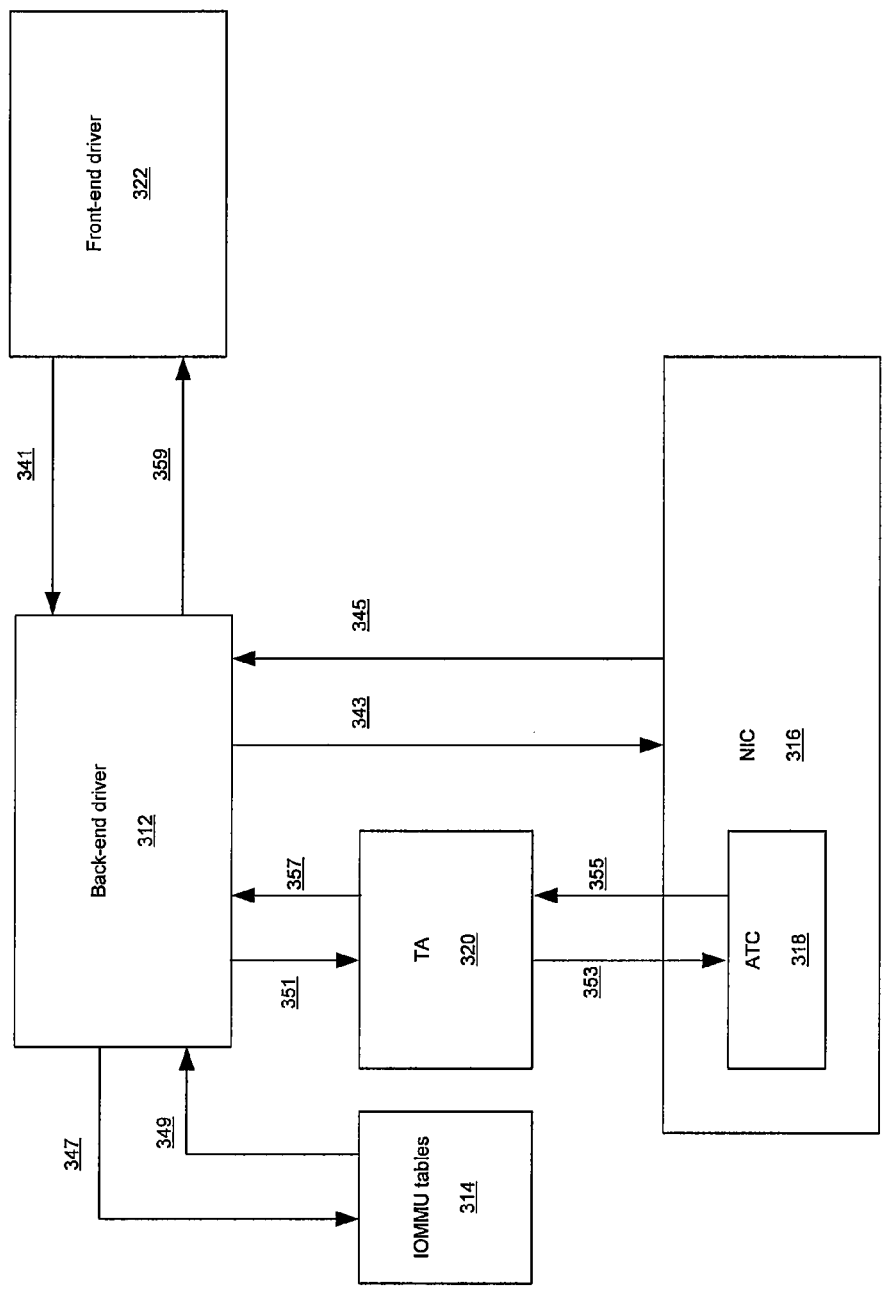
FIG. 3C is a diagram illustrating exemplary steps for de-allocating GOS static data structures, in accordance with an embodiment of the invention.

FIG. 3C is a diagram illustrating exemplary steps for de-allocating GOS static data structures, in accordance with an embodiment of the invention. Referring to FIG. 3C, there is shown the front-end driver 322, the back-end driver 312, the IOMMU tables 314, the NIC 316, the ATC 318, and the TA 320. In operation, when a GOS wishes to de-allocate data structures, for example, when a connection is to be torn down, when the application is to be killed, or when the GOS is to be killed, the front-end driver 322 may send a de-allocate resource command message 341 to the back-end driver 312. However the invention may not be limited to just the front-end driver 322 being the source of the request to de-allocate resources. For example, in the case where a GOS may have failed for some reason, the hypervisor 220 and/or the backend driver 222 may be the source of the de-allocation message to the hardware.

The de-allocate resource command message 341 may be sent at different times. For example, the de-allocate resource command message 341 may be sent immediately when the resource is not needed, or the command may be sent when the resource is needed for another job. The de-allocate resource command message 341 may also be sent when there is idle period for the front-end driver 322, the back-end driver 312, and/or the NIC 316. When the de-allocate resource command message 341 may be sent may be design dependent and/or implementation dependent. Accordingly, any of the three methods, or other methods not described here, may be used in any combination.

The back-end driver 312 may then send a slow path de-allocate resource command message 343 to the NIC 316 to invalidate an appropriate context entry, where the context entry may be for a connection, a GOS, or the NIC. The NIC may respond with an invalidate status message 345 after invalidating the appropriate context entries. After message 345 is received, the back-end driver 312 may also send invalidate command message 347 to the IOMMU tables 314. The IOMMU tables 314 may invalidate the appropriate entries and respond with an invalidate status message 349 after invalidating the appropriate context entries.

The back-end driver 312 may send an invalidate command 351 to the TA 320, which may then send an invalidate command 353 to the ATC 318. In various embodiments of the invention, there may only be a message that is sent to the NIC 316, and the NIC 316 may ensure it is not using, and will not be using, the GPA and may also clear the cache of any translation for the GPA if it existed. The ATC 318 may invalidate the address or addresses, and send a status message 355 to the TA 320. The TA 320 may then send a completion message 357 to the back-end driver 312. The back-end driver 312 may then unpin the memory that was invalidated. An embodiment of the invention may allow unpinning of a memory, for example, only after that memory has been invalidated. The back-end driver 312 may then send de-allocate resource status message 359 to the front-end driver 322.

While some embodiments of the invention may have the NIC 316 invalidate resources in a single step after receiving the invalidate resource command message 343 from the back-end driver 312, the invention need not be so limited. For example, the NIC 316 may also invalidate entries in a two-step process. The first step may be when the NIC 316 receives the slow path deallocate resource command message 343 from the back-end driver 312. The NIC 316 may return the invalidate status message 345 after verifying that it may not be using the resources to be de-allocated, but before de-allocating the resource. The relevant entries may then be removed from the ATC 318.

Figure 4A:
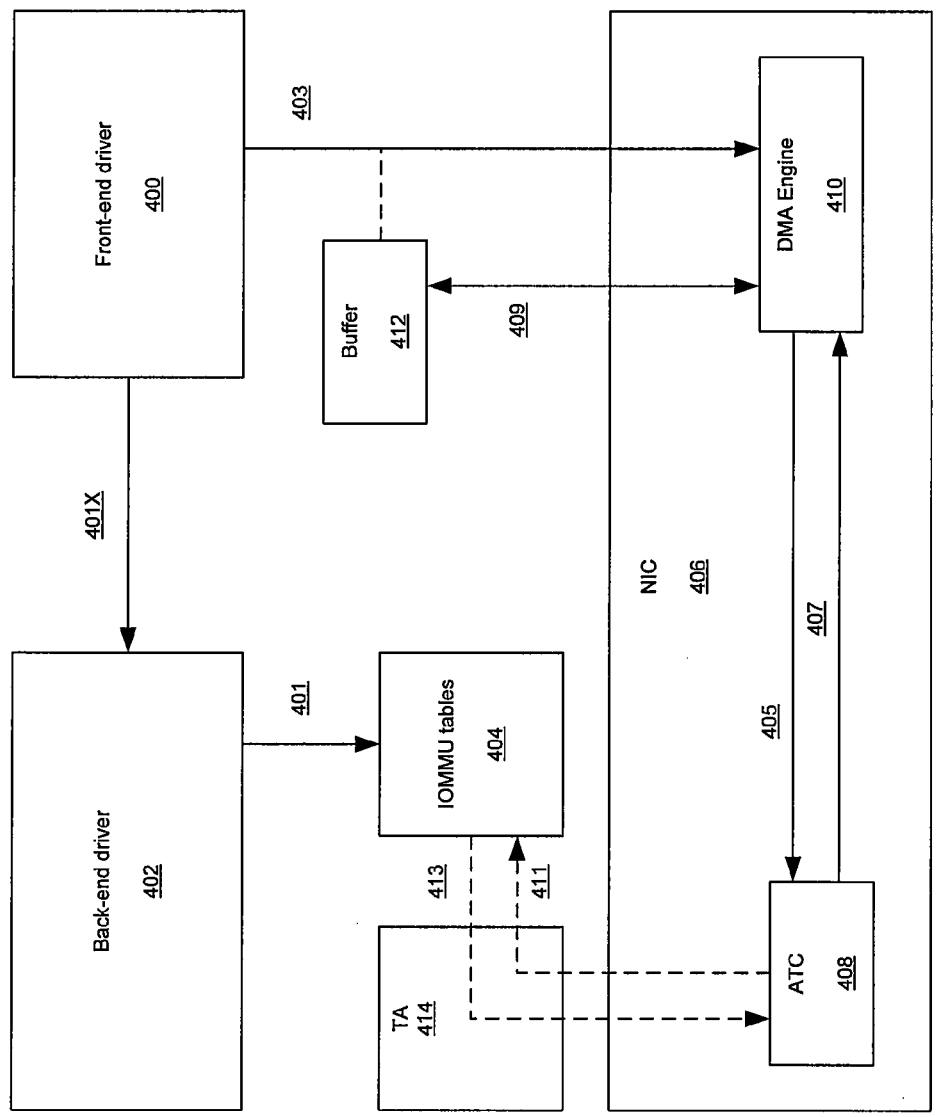
FIG. 4A is a diagram illustrating exemplary steps for using fast path buffers for data transmission and reception, in accordance with an embodiment of the invention.

FIG. 4A is a diagram illustrating exemplary steps for using fast path buffers for data transmission and reception, in accordance with an embodiment of the invention. Referring to FIG. 4A, there is shown a front-end driver 400, a back-end driver 402, IOMMU tables 404, a NIC 406, a buffer 412, and the TA 414. The NIC 406 may comprise an ATC 408 and a DMA engine 410. The front-end driver 400, the back-end driver 402, the IOMMU tables 404, the NIC 406, the ATC 408, and the TA 414 may be similar to corresponding parts described with respect to FIG. 3A. The DMA engine 410 may comprise suitable logic, circuitry and/or code that may enable transfer of data from one portion of memory to another portion of memory and/or from one portion of memory to the NIC and vice versa. The buffer 412 may be a portion of memory that may be used for storing data received from the network by the NIC 406 or for storing data that may be transmitted to the network by the NIC 406.

In operation, the fast path buffers, such as the buffer 412 may be physically pinned by a back-end driver, such as, for example, the back-end driver 402, and mapped to, for example, the IOMMU tables 404 when a GOS driver, such as, for example, the front-end driver 400, is loaded. This may take place via the loading step 401. The loading step 401 may occur, for example, after the front-end driver 400 is loaded. The front-end driver 400 may inform the back-end driver 402 via a message 401X that the front-end driver 400 is loaded. The buffer 412 may then be used by, for example, the DMA engine 410 for data transfer and the buffer 412 may not be swapped out while it is being used for DMA transfer.

The front-end driver 400 may allocate buffers that may be virtually pinned on GPAs. Virtual pinning may comprise the front-end driver 400 sending a pin request to, for example, a GOS that may be similar to the GOS 200, which may comprise the front-end driver 400. After the buffer has been pinned, the front-end driver 400 may also send a buffer descriptor message 403 for the buffer 412 to the NIC 406, where the buffer descriptor may comprise, for example, the GPA of the buffer 412. To access the buffer, the NIC 406 may need to use SPA. However, the NIC 406 may use the untranslated GPA first or a SPA translated from the GPA if, for example, the translated address is available in the ATC 408 and/or use the GPA by translation via the TA 414 and the IOMMU tables 404.

The DMA engine 410 in the NIC 406 may send a request message 405 for address translation of the GPA to the ATC 408. The ATC 408 may respond with a translated address SPA in the message 407. By using the SPA, the DMA engine 410 may DMA transfer data to the buffer 412 in step 409. The data may have been received from a network, and the received data may have been processed to remove, for example, headers and/or footers for various network layers. The data in the buffer 412 may be for use by, for example, the application software 202. The data in the buffer 412 may also be processed, for example, for network layers above the network layers in, for example, the NIC 406. The network layers supported by the NIC 406 may be design dependent, and accordingly, the network layers supported by the front-end driver may also be design dependent.

Similarly, data that may be in the buffer 412, which may have been placed there by the application software 202, for example, may be copied to the NIC 406 in step 409 for transmission to a network. The NIC 406 then may append headers and/or footers as needed before transmitting the data on to a network.

If the ATC 408 does not have the translation for the received GPA in the message 405, the ATC 408 may send a translation request 411 to the TA 414 which may be forwarded to the IOMMU tables 404. The translated address in the IOMMU tables 404 may be communicated to the ATC 408 via the TA 414 in a message 413. The translated address SPA may then be communicated to the DMA engine 410 by the ATC 408 in the message 407.

Figure 4B:
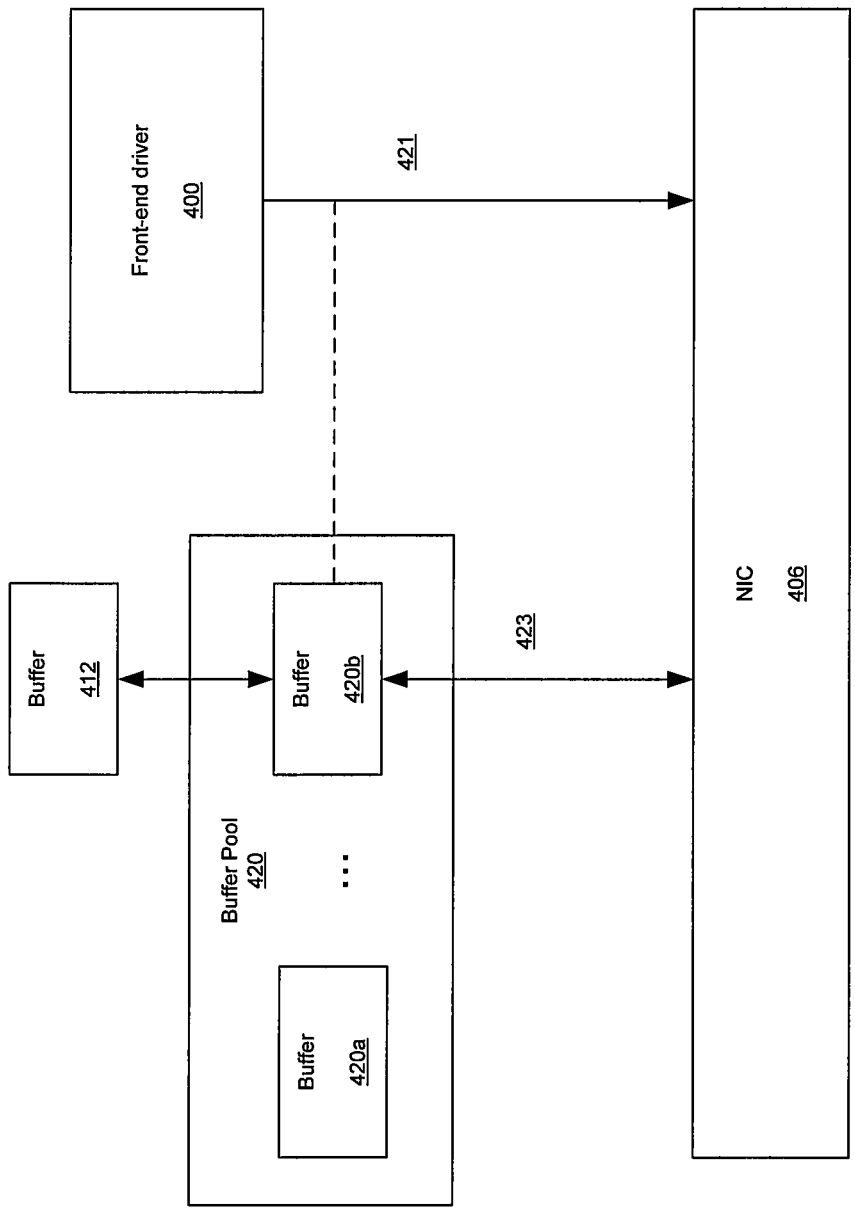
FIG. 4B is a diagram illustrating use of pre-allocated fast path buffers for data transmission and reception, in accordance with an embodiment of the invention.

FIG. 4B is a diagram illustrating use of pre-allocated fast path buffers for data transmission and reception, in accordance with an embodiment of the invention. Referring to FIG. 4B, there is shown the front-end driver 400, the NIC 406, the buffer 412, and the buffer pool 420. The buffer pool 420 may comprise buffers 420a . . . 420b, where the buffers 420a . . . 420b may have been pre-allocated by the front-end driver 400 in its GPA space. The number of the buffers 420a . . . 420b may be design dependent. The buffers 420a . . . 420b may be physically pinned and IOMMU mapped in, for example, the IOMMU tables 314. The pre-allocation by the front-end driver 400 may be executed, for example, when the front-end driver 400 is first loaded. The buffers 420a . . . 420b may be de-allocated, for example, in instances when the front-end driver 400 may be unloaded.

In operation, the application software 202 may place data in the buffer 412 as part of its operation. For example, the data in the buffer 412 may be an email to be sent. The front-end driver 400 may copy the data in the buffer 412 to, for example, the buffer 420b, and the buffer descriptor for the buffer 420b may be communicated to the NIC 406 in the command message 421. The NIC 406 may, for example, DMA transfer 423 the data in the buffer 420b using the DMA engine 410. The DMA transfer may comprise, for example, translation of addresses that may be similar to the process described with respect to FIG. 4A. The data may then be appropriately processed by the NIC 406 to add headers and/or footers before being transmitted on to the network.

Similarly, when data is received from the network by the NIC 406, the NIC 406 may remove headers and/or footers for various network layers. The data may then be transferred via DMA transfer 423 to, for example, the buffer 420b by the DMA engine 410. The front-end driver 400 may then further process the data in the buffer 420b, and copy the resulting data to the buffer 412. The application software 202 may then access the data in the buffer 412.

Figure 4C:
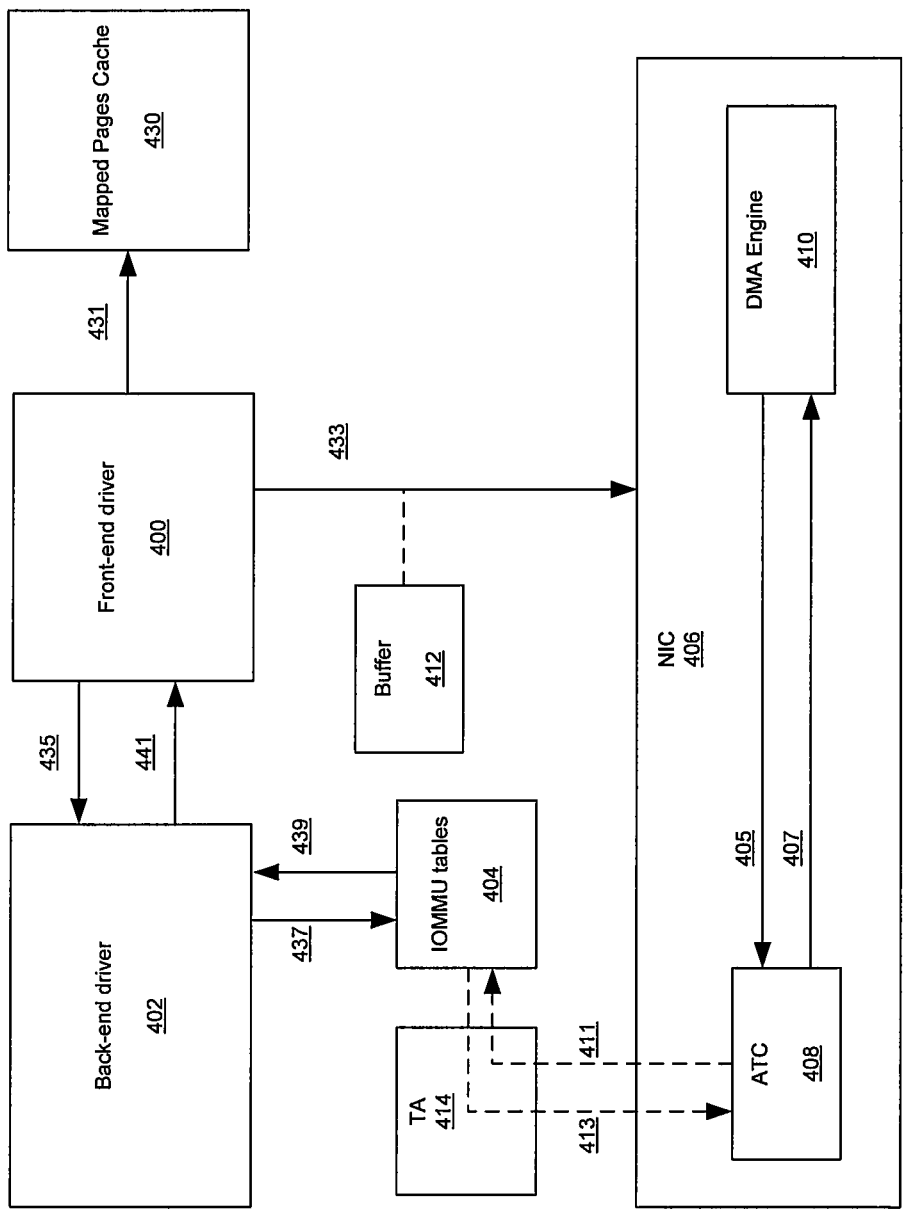
FIG. 4C is a diagram illustrating exemplary steps for using pinned pages cache for fast path buffers, in accordance with an embodiment of the invention.

FIG. 4C is a diagram illustrating exemplary steps for using pinned pages cache for fast path buffers, in accordance with an embodiment of the invention. Referring to FIG. 4C, there is shown the front-end driver 400, the back-end driver 402, the IOMMU tables 404, the NIC 406, the buffer 412, the TA 414, and mapped pages cache 430. The NIC 406 may comprise the ATC 408 and the DMA engine 410.

In operation, the front-end driver 400 may keep a cache of pinned and IOMMU mapped buffers in the mapped pages cache 430. When a buffer is posted to the front-end driver 400, the front-end driver 400 may perform a search 431 for the GPA of the buffer 412 in the mapped pages cache 430. If the GPA for the buffer 412 is found in the mapped pages cache 430, the buffer 412 may already be pinned and IOMMU mapped. The front-end driver 400 may, then post the GPA of the buffer 412 to the NIC 406. Accordingly, the buffer descriptor for the buffer 412 may be communicated to the NIC 406 in a command message 433, and the buffer 412 may be used for data transmission or reception to/from a network.

If the GPA is not found in the mapped pages cache 430, the front-end driver 400 may perform a hypercall or a back-end call message 435 to the back-end driver 402 to physically pin and IOMMU map the buffer 412. The back-end driver 402 may then verify that the front-end driver 400 has not reached its limit of pinned buffers, where the number of pinned buffers per front-end driver may be design dependent. If the front-end driver 400 has not reached its, limit, the buffer 412 may be physically pinned and a message 437 may be sent by the back-end driver 402 to the IOMMU tables 404 to map the buffer 412. The back-end driver 402 may receive a status message 439 from the IOMMU tables 404, and may communicate to the front-end driver 400 via a status message 441 that the buffer 412 has been pinned and mapped. The buffer descriptor for the buffer 412 may then be communicated to the NIC 406 in the command message 433, and the buffer 412 may be used for data transmission or reception to a network.

If the back-end driver 402 indicates via status message 441 that the front-end driver 400 has already reached its limit of pinned buffers, or if the mapped pages cache 430 is full and there is no match, then the front-end driver 400 may free N least recently used entries in the mapped pages cache 430. The specific algorithm for determining the N least recently used entries may be design dependent. Freeing the N cache entries may be done after the front-end driver 400 makes sure that this buffer is not used by the NIC 406 and may comprise, for example, a hypercall or a back-end call message 435 to the back-end driver 402 to unpin and un-map a specific buffer or buffers. In some embodiments of the invention, the front-end driver 400 may keep track of buffer usage and may provide hints to the NIC 405 as to which of the NIC resources may be involved with using that buffer. This may shorten the time it takes the NIC 406 to free the buffer. The front-end driver 400 may then retry via a hypercall or a back-end call message 435 to the back-end driver 402 to physically pin and IOMMU map the buffer 412. If the back-end driver 402 needs to unpin physical pages owned by the front-end driver 400, the back-end driver 402 may notify the front-end driver via, for example, the status message 441, that the front-end driver 400 may need to stop using these buffers.

If the DMA engine 410 needs a translated address, it may send a message 405 requesting GPA translation to the ATC 408. The SPA may be translated by the ATC 408, as described with respect to FIG. 4A. The DMA engine 410 may then receive the translated address from the ATC 408 in message 407, whereby the buffer 412 may be accessed for data transfer.

Figure 4D:
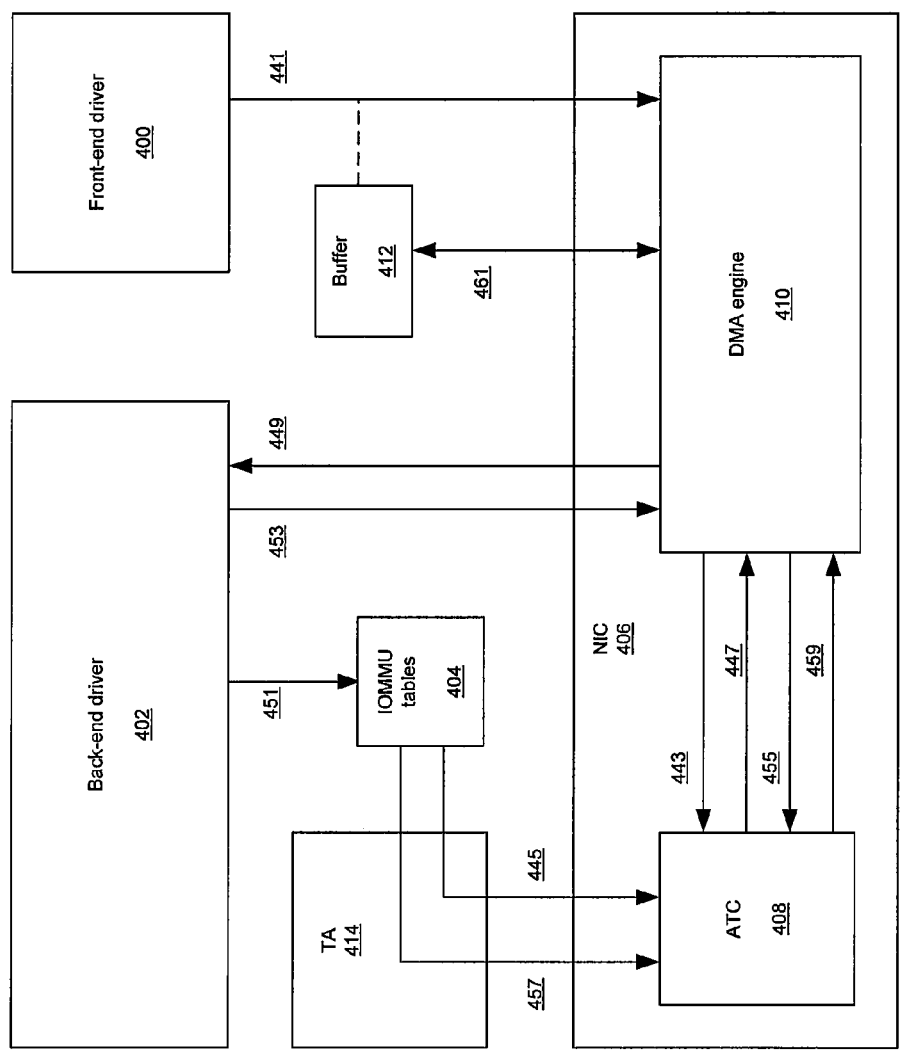
FIG. 4D is a diagram illustrating exemplary steps for pinning fast path buffers on demand, in accordance with an embodiment of the invention.

FIG. 4D is a diagram illustrating exemplary steps for pinning fast path buffers on demand, in accordance with an embodiment of the invention. Referring to FIG. 4D, there is shown the front-end driver 400, the back-end driver 402, the IOMMU tables 404, the NIC 406, the buffer 412, and the TA 414. The NIC 406 may comprise the ATC 408 and the DMA engine 410.

In operation, the front-end driver 400 may allocate buffers, such as, for example, the buffer 412 that may be virtually pinned, for transfer of data to/from the NIC 406. The front-end driver 400 may send a command message 441 to the NIC 406 that may comprise the GPA of the buffer 412. The command message 441 may comprise, for example, posting a GPA to the TX queue 108b or the RX queue 108c. The DMA engine 410 in the NIC 406 may use the GPA of the buffer 412 to DMA transfer data from the buffer 412 to the NIC 406. The data that may be DMA transferred from the buffer 412 may be, for example, processed for the network layers supported by the NIC 406 and then transmitted to a network. The processing may comprise, for example, adding appropriate headers and/or footers for the network layers supported by the NIC 406.

Similarly, data received from a network may be processed to remove headers and/or footers by the network layers supported by the NIC 406 before being DMA transferred to the buffer 412. The DMA engine 410 may send a request message 443 for address translation to the ATC 408. If the GPA of the buffer 412 is in the ATC 408, the translated address may be communicated to the DMA engine 410 as a status message 447. The DMA engine 410 may perform a DMA transfer as indicated by the command message 441 by executing transfer of data 461 to or from the buffer 412.

However, if the buffer 412 is not in the ATC 408, then the ATC 408 may send a translate request to, for example, the TA 414. The TA 414 may generate a response based on the IOMMU tables 404. The translated address may be stored in the IOMMU tables 404, and the translated address may be communicated in a message 445 to the ATC 408. The ATC 408 may then communicate the translated address as a status message 447 to the DMA engine 410. The DMA engine 410 may then DMA transfer data appropriately as indicated in the command message 441.

If the IOMMU tables 404 reports a translate failure in the message 445, then the ATC may indicate this to the DMA engine 410 via the status message 447. The DMA engine 410 may then send a page fault event message 449 to the back-end driver 402, and pause any DMA transfer using the address associated with the translation failure and/or any other relevant receive or transmit DMA to the related connection, GOS, and/or NIC. The back-end driver 402, upon receiving the page fault event message 449 from the NIC 406, may physically pin the faulted buffer 412 by its GPA. The buffer 412 may be IOMMU mapped via the operation 451, which may include address translation. A response message 453 may be sent to the NIC 406 indicating that the buffer 412 may now be valid for DMA use.

The DMA engine 410 may then send another command message 455 to the ATC 408. The ATC 408 may request a translation, and a message 457 comprising the translated address may be communicated to the ATC 408. The ATC 408 may communicate the translated address to the DMA engine 410 in the message 459. The DMA engine 410 may then perform the DMA transfer as indicated in the command message 441.

The NIC 406 may recover from translation errors. For example, in a transmit path, the NIC 406 may pause transmission on a connection with the translation error, and the transmission may continue without loss of data. However, in a receive path, a received packet may be dropped if there is a translation error for the placement buffer, for example, the buffer 412.

Figure 5A:
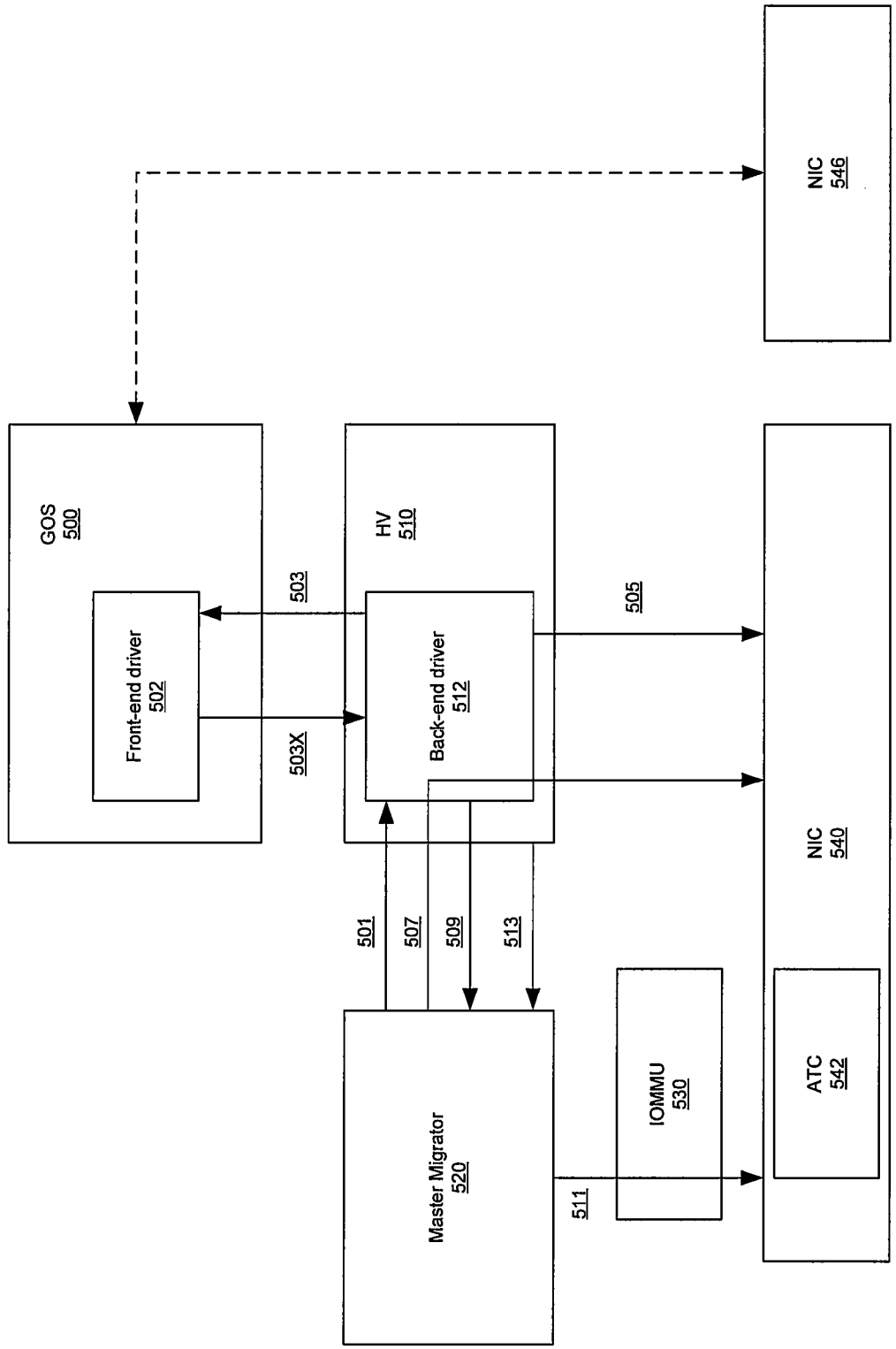
FIG. 5A is a diagram illustrating exemplary steps in a source machine for migrating across a same type of type of NIC, in accordance with an embodiment of the invention.

FIG. 5A is a diagram illustrating exemplary steps in a source machine for migrating across a same type of NIC, in accordance with an embodiment of the invention. Referring to FIG. 5A, there is shown a GOS 500, a hypervisor 510, a master migrator block 520, a IOMMU block 530, and a NIC 540. There is also shown a target NIC 546 that the GOS 500 may communicate with after migration. The GOS 500 may comprise a front-end driver 502, and the GOS 500 may be similar to the GOS 200 that may comprise the front-end driver 206. The hypervisor 510 may comprise the back-end driver 512, and the hypervisor 510 may be similar to the hypervisor 220 that may comprise the back-end driver 222. The master migrator block 520 may comprise suitable logic, circuitry, and/or code that may enable overseeing migration of functionality of a GOS to operate on, for example, a different NIC on a new host. In some embodiments of the invention, the hypervisor 510 may comprise the master migrator 520. The migration may be, for example, a live migration that takes place while the present host and the new host are in operation. The IOMMU block 530 may be similar to the IOMMU tables 314, and may also, for example, comprise the TA 320. The NIC 540 may comprise an ATC 542, and the NIC may be similar to the NIC 316.

In migrating a GOS where, for example, that GOS will run on a different NIC on a new host, the master migrator block 520 may control various operations in the source machine. Migration may occur, for example, when a hardware device, such as a NIC or a blade, fails. Migration may also take place to load-balance various network servers. A source machine may be, for example, a blade in a blade server or an individual network server. The master migrator block 520 may, for example, update the host memory 120 with the dirty memory objects in the NIC 540. The master migrator block 520 may also indicate to the NIC 540 to update the host memory 120. After updating the host memory 120 with the present dirty memory objects, the NIC 540 may respond to the master migrator block 520 that update is complete.

The master migrator 520 may send a message 501 to the back-end driver 512, indicating that the back-end driver 512 may complete pending transactions. The back-end driver 512 may then send a message 503 to the front-end driver 502 for it to finish pending transactions. Various embodiments of the invention may allow the front-end driver 502 to indicate via a message 503X to the back-end driver 512 that the pending transactions may have been completed. The back-end driver 512 may also finish up all pending slow-path transactions 505 with the NIC 540 that may be associated with the GOS 500 that is to be migrated. The back-end driver 512 may de-allocate all NIC resources that were dedicated to the GOS 500. The master migrator block 520 may then halt operation of the GOS 500. The master migrator block 520 may make an update of any other memory objects that may have been generated and/or altered by the NIC 540 since the NIC 540 last updated the host memory 120. For example, the NIC 540 may have communicated to the master migrator block 520 the addresses of the dirty memory objects. Various embodiments of the invention may allow updating of the dirty memory objects to be communicated to, for example, the back-end driver 512.

The master migrator block 520 may put the portion of the NIC 540 related to the GOS 500 in a quiescent state to prepare for the migration. Various embodiments of the invention may accomplish this via, for example, a message 507. The master migrator block 520 may also save a "snapshot" of memory objects that correspond to the GOS 500 being migrated. The memory objects may comprise, for example, portions of the host memory 120 that may be used to keep track of stateful data for various network connections for the GOS 500. Stateful data may be data that involves present and past state information.

The back-end driver 512 may also communicate via a message 509 a device-state structure to the master migrator block 520, and the master migrator block 520 may save the structure for future use. The device-state structure may comprise various states that may include states for various connections for the GOS 500. The master migrator block 520 may also unmap the IOMMU mapped pages for the GOS 500. The master migrator block 520 may communicate via a message 511, for example, to have the ATC 542 flushed and also to perform a functional level reset of the NIC 540 related to the state and hardware used to service GOS 500. The master migrator block 520 may also receive from the hypervisor 510 messages 513 that may comprise a list of pinned pages and IOMMU mapped pages.

Figure 5B:
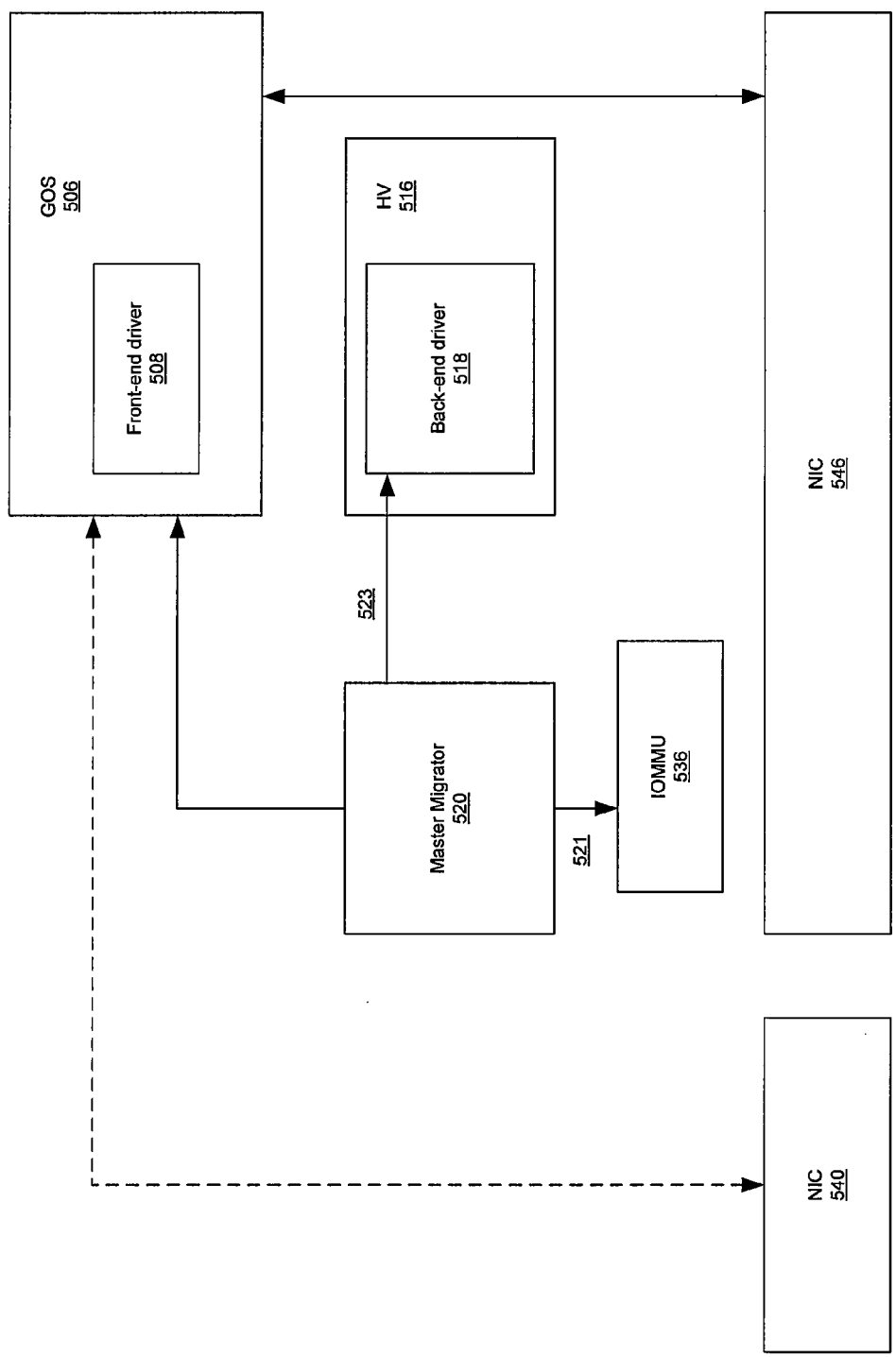
FIG. 5B is a diagram illustrating exemplary steps in a target machine for migrating across a same type of NIC, in accordance with an embodiment of the invention.

FIG. 5B is a diagram illustrating exemplary steps in a target machine for migrating across a same type of NIC, in accordance with an embodiment of the invention. Referring to FIG. 5B, there is shown the GOS 506 comprising the front-end driver 508, the hypervisor 516 comprising the back-end driver 518, the master migrator block 520, the IOMMU block 536, and the NIC 546. In some embodiments of the invention, the hypervisor 510 in the source machine may comprise the master migrator 520. In some embodiments of the invention, the IOMMU block 536 may comprise the TA 320. There is also shown a source NIC 546 that the GOS 506 may have communicated with prior to migration. These blocks may be similar to the corresponding blocks described with respect to FIG. 5A.

In migrating a GOS where, for example, that GOS will run on a different NIC on a new host, the master migrator block 520 may control various operations in the target machine. The target machine may be, for example, a blade in a blade server or a discrete network server. For example, the master migrator block 520 may communicate via a message 521 the pinned pages and IOMMU mappings received via the messages 513 to the IOMMU block 536. With respect to the IOMMU mappings for the target machine, the PCI addresses may be the same as PCI addresses for the source machine. However, the SPAs that the PCI addresses may be mapped to may be different.

The master migrator block 520 may migrate the device state structure received via the message 509 to the back-end driver 518. The master migrator block 520 may then migrate the snapshot of the memory that corresponds to the GOS 500 to the GOS 506. The master migrator block 520 may then start operation of the GOS 506. Accordingly, the GOS 506 may communicate directly with the NIC 546.

Figure 6A:
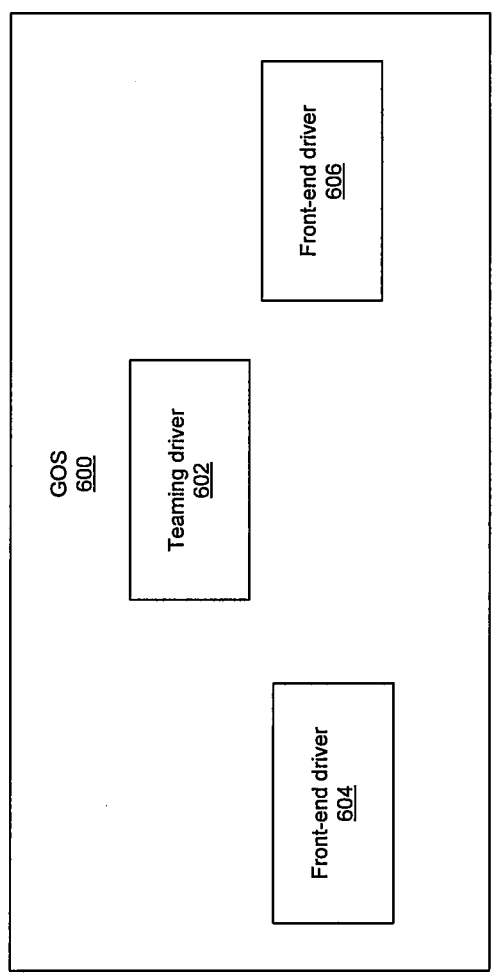
FIG. 6A is a diagram illustrating exemplary GOS with multiple front-end drivers, in accordance with an embodiment of the invention.

FIG. 6A is a diagram illustrating exemplary GOS with multiple front-end drivers, in accordance with an embodiment of the invention. Referring to FIG. 6A, there is shown a GOS 600 that comprises a teaming driver 602 and front-end drivers 602 and 604. The teaming driver 602 may comprise code that may enable coordination of the various drivers in a machine, for example, the front-end drivers 604 and 606. One use for the multiple front-end drivers may be to provide redundancy for the front-end drivers. Another use for the multiple front-end drivers may be to support different hardware devices, such as, for example, a plurality of different NICs. For example, a GOS may be migrated from one NIC to another where the NICs may be different types. The use of multiple front-end drivers for GOS migration may be described with respect to FIG. 6B.

Figure 6B:
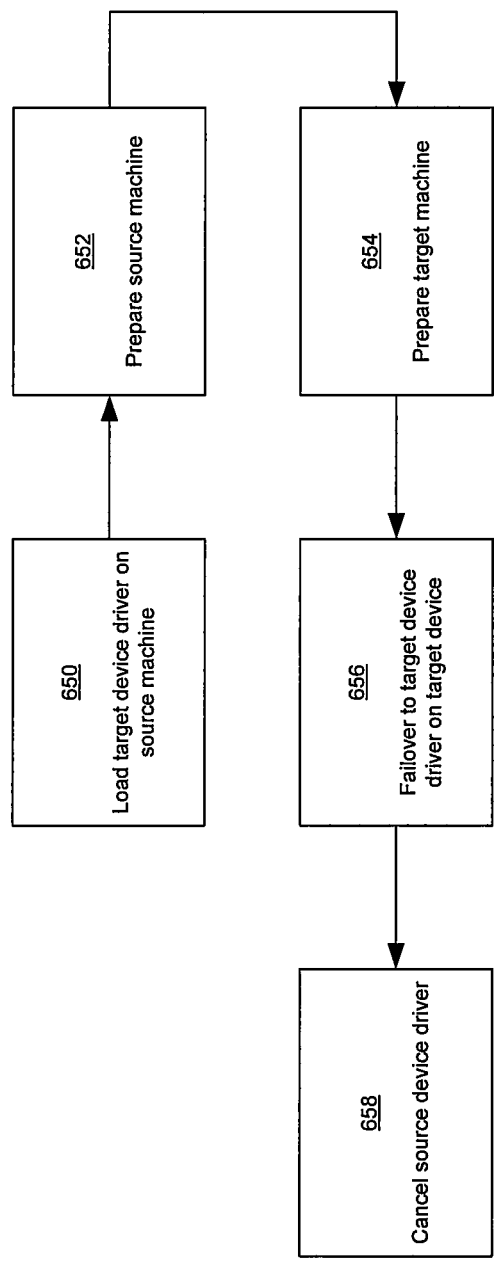
FIG. 6B is a flow diagram illustrating exemplary steps for migrating across different types of NIC, in accordance with an embodiment of the invention.

FIG. 6B is a flow diagram illustrating exemplary steps for migrating across different types of NIC, in accordance with an embodiment of the invention. Referring to FIG. 6B, there is shown steps 650 to 658. In step 650, a target device driver, such as, for example, the front-end driver 606, that may be similar to the device driver in the target machine may be loaded on a source machine below a teaming driver, such as, for example, the teaming driver 602. The target device driver may be suitable, for example, for interfacing to a NIC used in the target machine. The teaming driver 602 may be used to coordinate the various drivers in a machine, for example, the target device driver and a source device driver in the source machine. In step 652, the source machine may be prepared for migration. The preparation may be similar to the steps described with respect to FIG. 5A. In step 654, the target machine may be prepared for migration. The preparation may be similar to the steps described with respect to FIG. 5B.

In step 656, a GOS, such as, for example, the GOS 600, migrated to the target machine may failover from a source device driver, such as, for example, the front-end driver 604, to the target device driver 606. For example, the teaming driver 602 in the target machine may declare a fail condition for the source device driver 604 in the target machine. Accordingly, the source device driver 604, which may have been suitable for use with the NIC from the source machine, but not suitable for use with the NIC in the target machine, may be taken out of service. In step 658, the source device driver 604 in the target machine may be canceled so that the teaming driver 602 will not switch to the source device driver 604 even if the target device driver 606 fails. A GOS migration may also occur between two NICs that may be of the same type.

In accordance with an embodiment of the invention, aspects of an exemplary system may comprise a first network interface device, such as, for example, the NIC 540, which may provide access to a network, and which may be directly accessed by a plurality of GOSs 200 . . . 210. One or more of the GOSs, for example, the GOS 500, may be migrated to directly access a second network interface device, such as, for example, the NIC 546, where the migration may be based on state information for the GOS 500. The migration may comprise, for example, copying state information that corresponds to the GOS 500 to another host that may correspond to the NIC 546. The state information for the GOS 500 may be stored in, for example, the host memory 120.

However, the NIC 540 may also, for example, have objects not yet updated to the host memory 120. Accordingly, before the GOS 500 may be migrated, the host 106 may indicate to the NIC 540 to update the host memory 120 with these objects. The host 106 may also indicate to the GOS 500 to stop processing, and finish updating any objects in the NIC 540 that may need to be updated to the host memory 120. The information that may correspond to the GOS 500 to enable it to directly access the NIC 540 may now be transferred to another host so that the GOS 500 may now directly access the NIC 546. The host 106 may also, for example, update portions of the NIC 540 that may not been updated to the host memory 120. The NIC 540 may have, for example, communicated the addresses of these memory portions to the host 106.

The NIC 540 may be of the same type as the NIC 546, or the NIC 540 may be a different type than the NIC 546. Different types of NICs may comprise, for example, NICs with different firmware versions. The state information may be maintained, for example, in a host, such as, for example, the host system 106. The migration from a first NIC to a second NIC a may also be referred to as migration from a source NIC to a target NIC, where the source and target NICs may be in a same server/machine or different servers/machines. The GOS 500 may communicate data to a device coupled to the network via the direct accessing of the NIC 540 prior to migration and via the NIC 546 after the migration. Data received from a device coupled to the network may also be communicated to the GOS 500 via direct accessing the NIC 540 or 546.

The NIC 540 and/or 546 may cache addresses for buffers used by the GOS 500. The GOS 500 may allocate at least a portion of the buffers, and also deallocate the allocated buffers. The allocation and the deallocation may occur dynamically, for example. The GOS 500 may, for example, preallocate at least a portion of the buffers. The NIC 540, or the NIC 546, may translate a guest physical address and/or a device logical address to a system physical address for accessing the buffers. The GOS 500 may also cache buffer addresses of pinned and IOMMU mapped buffers allocated for the respective GOS.

Another embodiment may use a front-end driver 606 that may support the lowest common denominator of all target NICs in a given environment. That driver may have been pre-loaded on the source machine and teamed up using driver 602. In operation, the original front-end driver 604 may command a NIC to upload to the GOS 600 all states relevant to additional capabilities that the NIC may have that are not supported by the lowest common denominator front-end driver 606. Accordingly, after the upload, the GOS 600 may also be able to perform those operations. On the target machine, the front-end driver 606 may continue to be used. Migration of GOSs where the NICs in a virtualization domain all have at least a common driver with respect to the GOSs being migrated may be referred to as migration with a lowest common denominator driver.

Another embodiment of the invention may provide a machine-readable storage, having stored thereon, a computer program having at least one code section executable by a machine, thereby causing the machine to perform the steps as described herein for direct device access.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for network communication, the method comprising:
   directly accessing by one or more of a plurality of guest operating systems (GOSs), a first network interface device that provides access to a network, wherein said directly accessing comprises transferring data directly between said one or more of said plurality of GOSs and said first network interface device via a fast path that bypasses a hypervisor; and
   directly accessing by said one or more of said plurality of GOSs, after migrating from said first network interface device to a second network interface device, said second network interface device.

2. The method according to claim 1, comprising halting, prior to migrating said one or more GOSs to be migrated, operation of said one or more GOSs to be migrated.

3. The method according to claim 2, comprising updating a host memory of any dirty objects in said first network interface device after said one or more GOSs to be migrated is halted.

4. The method according to claim 1, comprising indicating by a host to said first network interface device to make updates to host memory of dirty objects that correspond to said one or more GOSs to be migrated.

5. The method according to claim 4, comprising migrating said one or more GOSs to said second network interface device by transferring state information for said one or more of said plurality of GOSs that is stored in said host memory after said first network interface device indicates to said host that said updates are made.

6. The method according to claim 1, wherein said first network interface device is a different type of network interface device than said second network interface device.

7. The method according to claim 1, comprising communicating data originating from said one or more of said plurality of GOSs to a device coupled to said network via said direct accessing of said first network interface device and/or said second network interface device.

8. The method according to claim 1, comprising communicating data received from a device coupled to said network to one or more of said plurality of GOSs via said direct accessing of said first network interface device and/or said second network interface device.

9. The method according to claim 1, comprising caching addresses in said first network interface device and/or said second network interface device for buffers used by said plurality of GOSs.

10. The method according to claim 9, wherein said one or more of said plurality of GOSs allocates and/or deallocates at least a portion of said buffers.

11. The method according to claim 9, wherein said one or more of said plurality of GOSs preallocate at least a portion of said buffers.

12. The method according to claim 9, comprising translating by said first network interface device and/or said second network interface device a guest physical address and/or a device logical address to a system physical address for accessing said buffers.

13. The method according to claim 1, comprising caching addresses of pinned and/or IOMMU mapped buffers by each GOS that uses said pinned and/or IOMMU mapped buffers.

14. The method according to claim 1, comprising pinning fast path buffers on demand.

15. The method according to claim 1, comprising physically pinning buffers.

16. The method according to claim 1, comprising virtually pinning buffers.

17. The method according to claim 1, comprising migrating with a lowest common denominator driver among network interface devices.

18. A non-transitory machine-readable storage having stored thereon, a computer program having at least one code section for network communication, the at least one code section being executable by a machine for causing the machine to perform steps comprising:
   directly accessing by one or more of a plurality of guest operating systems (GOSs), a first network interface device that provides access to a network, wherein said directly accessing comprises transferring data directly between said one or more of said plurality of GOSs and said first network interface device via a fast path that bypasses a hypervisor; and
   directly accessing by said one or more of said plurality of GOSs, after migrating from said first network interface device to a second network interface device, said second network interface device.

19. The non-transitory machine-readable storage according to claim 18, wherein said at least one code section comprises code for halting, prior to migrating said one or more GOSs to be migrated, operation of said one or more GOSs to be migrated.

20. The non-transitory machine-readable storage according to claim 19, wherein said at least one code section comprises code for updating a host memory of any dirty objects in said first network interface device after said one or more GOSs to be migrated is halted.

21. The non-transitory machine-readable storage according to claim 18, wherein said at least one code section comprises code for indicating by a host to said first network interface device to make updates to host memory of dirty objects that correspond to said one or more GOSs to be migrated.

22. The non-transitory machine-readable storage according to claim 21, wherein said at least one code section comprises code for migrating said one or more GOSs to said second network interface device by transferring state information for said one or more of said plurality of GOSs that is stored in said host memory after said first network interface device indicates to said host that said updates are made.

23. The non-transitory machine-readable storage according to claim 18, wherein said first network interface device is a different type of network interface device than said second network interface device.

24. The non-transitory machine-readable storage according to claim 18, wherein said at least one code section comprises code for communicating data originating from said one or more of said plurality of GOSs to a device coupled to said network via said direct accessing of said first network interface device and/or said second network interface device.

25. The non-transitory machine-readable storage according to claim 18, wherein said at least one code section comprises code for communicating data received from a device coupled to said network to said one or more of said plurality of GOSs via said direct accessing of said first network interface device and/or said second network interface device.

26. The non-transitory machine-readable storage according to claim 18, wherein said at least one code section comprises code for caching addresses in said first network interface device and/or said second network interface device for buffers used by said plurality of GOSs.

27. The non-transitory machine-readable storage according to claim 26, wherein said one or more of said plurality of GOSs allocates and/or deallocates at least a portion of said buffers.

28. The non-transitory machine-readable storage according to claim 26, wherein said one or more of said plurality of GOSs preallocate at least a portion of said buffers.

29. The non-transitory machine-readable storage according to claim 26, wherein said at least one code section comprises code for translating by said first network interface device and/or said second network interface device a guest physical address and/or a device logical address to a system physical address for accessing said buffers.

30. The non-transitory machine-readable storage according to claim 18, wherein said at least one code section comprises code for caching addresses of pinned and/or IOMMU mapped buffers by each GOS that uses said pinned and/or IOMMU mapped buffers.

31. The non-transitory machine-readable storage according to claim 18, wherein said at least one code section comprises code for pinning fast path buffers on demand.

32. The non-transitory machine-readable storage according to claim 18, wherein said at least one code section comprises code for physically pinning buffers.

33. The non-transitory machine-readable storage according to claim 18, wherein said at least one code section comprises code for virtually pinning buffers.

34. The non-transitory machine-readable storage according to claim 18, wherein said at least one code section comprises code for migrating with a lowest common denominator driver among network interface devices.

35. A system for network communication, the system comprising:
   one or more processors that enable directly accessing of a first network interface device that provides access to a network, by one or more of a plurality of guest operating systems (GOSs), wherein said directly accessing comprises transferring data directly between said one or more of said plurality of GOSs and said first network interface device via a fast path that enables hypervisor bypassing; and
   said one or more processors enable directly accessing a second network interface device by said one or more of said plurality of GOSs that migrated from said first network interface device to said second network interface device.

36. The system according to claim 35, wherein said one or more processors enable halting, prior to migrating said one or more GOSs to be migrated, of operation of said one or more GOSs to be migrated.

37. The system according to claim 36, wherein said one or more processors enable updating of a host memory of any dirty objects in said first network interface device after said one or more GOSs to be migrated is halted.

38. The system according to claim 35, wherein said one or more processors enable indicating to said first network interface device to make updates to host memory of dirty objects that correspond to said one or more GOSs to be migrated.

39. The system according to claim 38, wherein said one or more processors enable migrating of said one or more GOSs to said second network interface device by transferring state information for said one or more of said plurality of GOSs that is stored in said host memory after said first network interface device indicates to said host that said updates are made.

40. The system according to claim 35, wherein said first network interface device is a different type of network interface device than said second network interface device.

41. The system according to claim 35, wherein said one or more processors enable communication of data originating from one or more of said plurality of GOSs to a device coupled to said network via said direct accessing of said first network interface device and/or said second network interface device.

42. The system according to claim 35, wherein said one or more processors enable communication of data received from a device coupled to said network to said one or more of said plurality of GOSs via said direct accessing of said first network interface device and/or said second network interface device.

43. The system according to claim 35, wherein said one or more processors enable caching of addresses in said first network interface device and/or said second network interface device for buffers used by said plurality of GOSs.

44. The system according to claim 43, wherein said one or more of said plurality of GOSs allocates and/or deallocates at least a portion of said buffers.

45. The system according to claim 43, wherein said one or more of said plurality of GOSs preallocate at least a portion of said buffers.

46. The system according to claim 43, wherein said one or more processors enable translation by said first network interface device and/or said second network interface device, of a guest physical address and/or a device logical address to a system physical address for accessing said buffers.

47. The system according to claim 35, wherein said one or more processors enable caching of addresses of pinned and/or IOMMU mapped buffers by each GOS that uses said pinned and/or IOMMU mapped buffers.

48. The system according to claim 35, wherein said one or more processors enable pinning of fast path buffers on demand.

49. The system according to claim 35, wherein said one or more processors enable physically pinning of buffers.

50. The system according to claim 35, wherein said one or more processors enable virtually pinning of buffers.

51. The system according to claim 35, wherein said one or more processors enable migrating with a lowest common denominator driver among network interface devices.

\* \* \* \* \*